(12) United States Patent
Yun et al.

(10) Patent No.: US 12,200,153 B2
(45) Date of Patent: Jan. 14, 2025

(54) ELECTRONIC DEVICE INCLUDING SPEAKER MODULE AND RECEIVER MODULE

(71) Applicant: SAMSUNG ELECTRONICS CO., LTD., Suwon-si (KR)

(72) Inventors: Sunpyo Yun, Suwon-si (KR); Jeeyoun Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 229 days.

(21) Appl. No.: 17/952,833

(22) Filed: Sep. 26, 2022

(65) Prior Publication Data

US 2023/0046958 A1    Feb. 16, 2023

Related U.S. Application Data

(63) Continuation of application No. PCT/KR2022/011834, filed on Aug. 9, 2022.

(30) Foreign Application Priority Data

Aug. 10, 2021 (KR) .................. 10-2021-0105586

(51) Int. Cl.
*H04M 1/02*      (2006.01)
*G10K 11/26*    (2006.01)
(Continued)

(52) U.S. Cl.
CPC ............. *H04M 1/026* (2013.01); *G10K 11/26* (2013.01); *H04R 1/083* (2013.01); *H04R 1/323* (2013.01)

(58) Field of Classification Search
CPC .... H04R 2499/11; H04R 1/323; H04R 1/345; H04R 1/2842; H04R 1/08; H04R 1/02; G10K 11/26
See application file for complete search history.

(56) References Cited

U.S. PATENT DOCUMENTS 10,834,495 B2 * 11/2020 Lee .................. H04R 1/02
11,218,582 B2    1/2022 Hwang et al.
(Continued)

FOREIGN PATENT DOCUMENTS

CN      104853014      8/2015
CN      106162467      11/2016
(Continued)

OTHER PUBLICATIONS

Japanese Office Action issued Mar. 5, 2024 in corresponding Japanese Patent Application No. 2022-575242.
(Continued)

*Primary Examiner* — Sunita Joshi
(74) *Attorney, Agent, or Firm* — Nixon & Vanderhye, P.C.

(57) ABSTRACT

An electronic device according to various embodiments disclosed herein may include: a housing, a camera module comprising a camera disposed in the housing, a speaker module comprising a speaker positioned in a first direction with respect to the camera module, a receiver module comprising a receiver positioned in a second direction opposite to the first direction with respect to the camera module, first sound holes including a connection hole positioned in the first direction with respect to the camera module and a hole positioned in the second direction with respect to the camera module, the first sound holes being positioned on a side surface of the electronic device, a first sound conduit interconnecting the connection hole and the speaker module, a second sound hole positioned on a front surface of the electronic device, a second sound conduit including a connection conduit disposed in a third direction perpendicular to the first direction with respect to the first sound conduit, the second sound conduit interconnecting the second sound hole and the receiver module, and a connec- (Continued)

tion portion interconnecting the first sound conduit and the connection conduit of the second sound conduit.

20 Claims, 15 Drawing Sheets

(51) Int. Cl.
*H04R 1/08* (2006.01)
*H04R 1/32* (2006.01)

(56) References Cited

U.S. PATENT DOCUMENTS

| | | | |
|---|---|---|---|
| 11,750,958 B2 * | 9/2023 | Jun | H04R 1/2811 381/333 |
| 2005/0233781 A1 | 10/2005 | Erixon et al. | |
| 2006/0148540 A1 | 7/2006 | Vozenilek et al. | |
| 2009/0264156 A1 | 10/2009 | Burghardt et al. | |
| 2018/0132020 A1 | 5/2018 | Seo et al. | |
| 2018/0295222 A1 | 10/2018 | Jung et al. | |
| 2019/0342645 A1 | 11/2019 | Jung et al. | |
| 2021/0006876 A1 | 1/2021 | Moon et al. | |

FOREIGN PATENT DOCUMENTS

| | | |
|---|---|---|
| EP | 1379101 | 11/2009 |
| JP | 2005-341402 | 12/2005 |
| JP | 2007-208858 | 8/2007 |
| JP | 2008-141694 | 6/2008 |
| JP | 2011-155346 | 8/2011 |
| JP | 2013-197818 | 9/2013 |
| JP | 2014-003418 | 1/2014 |
| JP | 2016-012821 | 1/2016 |
| KR | 10-2018-0022195 | 3/2018 |
| KR | 10-2018-0052291 | 5/2018 |
| KR | 10-2018-0092155 | 8/2018 |
| KR | 10-2018-0113421 | 10/2018 |
| KR | 10-2019-0127184 | 11/2019 |
| KR | 10-2021-0003538 | 1/2021 |
| WO | 2004/073287 | 8/2004 |
| WO | 2022/092875 | 5/2022 |

OTHER PUBLICATIONS

Korean Office Action issued Aug. 22, 2023 in corresponding Korean Patent Application No. 10-2021-0105586.
Search Report and Written Opinion dated Nov. 3, 2022 issued in International Patent Application No. PCT/KR2022/011834.
Extended Search Report dated Aug. 29, 2024 in European Patent Application No. 22856167.6.

* cited by examiner of the electronic device. Accordingly, the sound output from the receiver module may be dispersed.

ELECTRONIC DEVICE INCLUDING SPEAKER MODULE AND RECEIVER MODULE

CROSS-REFERENCE TO RELATED APPLICATIONS

This application is a continuation of International Application No. PCT/KR2022/011834 designating the United States, filed on Aug. 9, 2022, in the Korean Intellectual Property Receiving Office and claiming priority to Korean Patent Application No. 10-2021-0105586, filed on Aug. 10, 2021, in the Korean Intellectual Property Office, the disclosures of which are incorporated by reference herein in their entireties.

BACKGROUND

Field

The disclosure relates to an electronic device including a speaker module and a receiver module.

Description of Related Art

As various contents are reproduced through electronic devices, the interest of users in sound performance is increasing. In order to transmit 3D sound to a user, speaker holes connected to a speaker module may exist at the upper and lower ends of an electronic device.

An electronic device may include a speaker module and a receiver module. The speaker module and the receiver module may be positioned in opposite directions with respect to a camera module disposed in the electronic device. In addition, a speaker hole that emits the sound output from the speaker module to the outside of the electronic device may be positioned on the side surface of the electronic device, and a receiver hole that emits the sound output from the receiver module to the outside of the electronic device may be positioned on the front surface of the electronic device.

Since the speaker module and the receiver module are positioned adjacent to each other with reference to the camera module, a speaker conduit interconnecting the speaker module and the speaker hole and a receiver conduit interconnecting the receiver module and the receiver hole may be positioned adjacent to each other. For example, at least a portion of the receiver conduit may be positioned to be directed from the rear surface to the front surface of the electronic device with respect to the speaker conduit. When a speaker hole is additionally provided in a direction adjacent to the receiver module, the speaker conduit and the receiver conduit may be connected to each other so that the sound output from the receiver module may be emitted to the added speaker hole. Accordingly, the sound output from the receiver module may be dispersed.

SUMMARY

An electronic device according to various example embodiments disclosed herein may include: a housing, a camera module comprising a camera disposed in the housing, a speaker module comprising a speaker positioned in a first direction with respect to the camera module, a receiver module comprising a receiver positioned in a second direction opposite to the first direction with respect to the camera module, first sound holes including a connection hole positioned in the first direction with respect to the camera module and a hole positioned in the second direction with respect to the camera module, the first sound holes being positioned on a side surface of the electronic device, a first sound conduit interconnecting the connection hole and the speaker module, a second sound hole positioned on a front surface of the electronic device, a second sound conduit including a connection conduit disposed in a third direction perpendicular to the first direction with respect to the first sound conduit, the second sound conduit interconnecting the second sound hole and the receiver module, and a connection portion interconnecting the first sound conduit and the connection conduit of the second sound conduit.

An electronic device according to various example embodiments disclosed herein may include: a housing, a camera module comprising a camera disposed in the housing, a speaker module comprising a speaker positioned in a first direction with respect to the camera module, a receiver module comprising a receiver positioned in a second direction opposite to the first direction with respect to the camera module, first sound holes positioned on a side surface of the housing, a first sound conduit interconnecting the first sound holes and the speaker module, a second sound hole positioned in a front surface of the housing, a second sound conduit including a connection conduit disposed in a third direction perpendicular to the first direction with respect to the first sound conduit, the second sound conduit interconnecting the second sound hole and the receiver module, and a connection portion interconnecting the first sound conduit and the connection conduit of the second sound conduit.

According to various example embodiments disclosed herein, since the speaker conduit and the receiver conduit are connected to each other, the speaker emission performance of the electronic device can be improved. In addition, even if a speaker hole is additionally provided in a direction adjacent to the receiver module, it is possible to provide a structure in which the sound output from the receiver module is not emitted to the speaker hole.

BRIEF DESCRIPTION OF THE DRAWINGS

In connection with the description of the drawings, the same or similar components may be denoted by the same or similar reference numerals. Further, the above and other aspects, features and advantages of certain embodiments of the present disclosure will be more apparent from the following detailed description, taken in conjunction with the accompanying drawings, in which.

DETAILED DESCRIPTION

Figure 1:
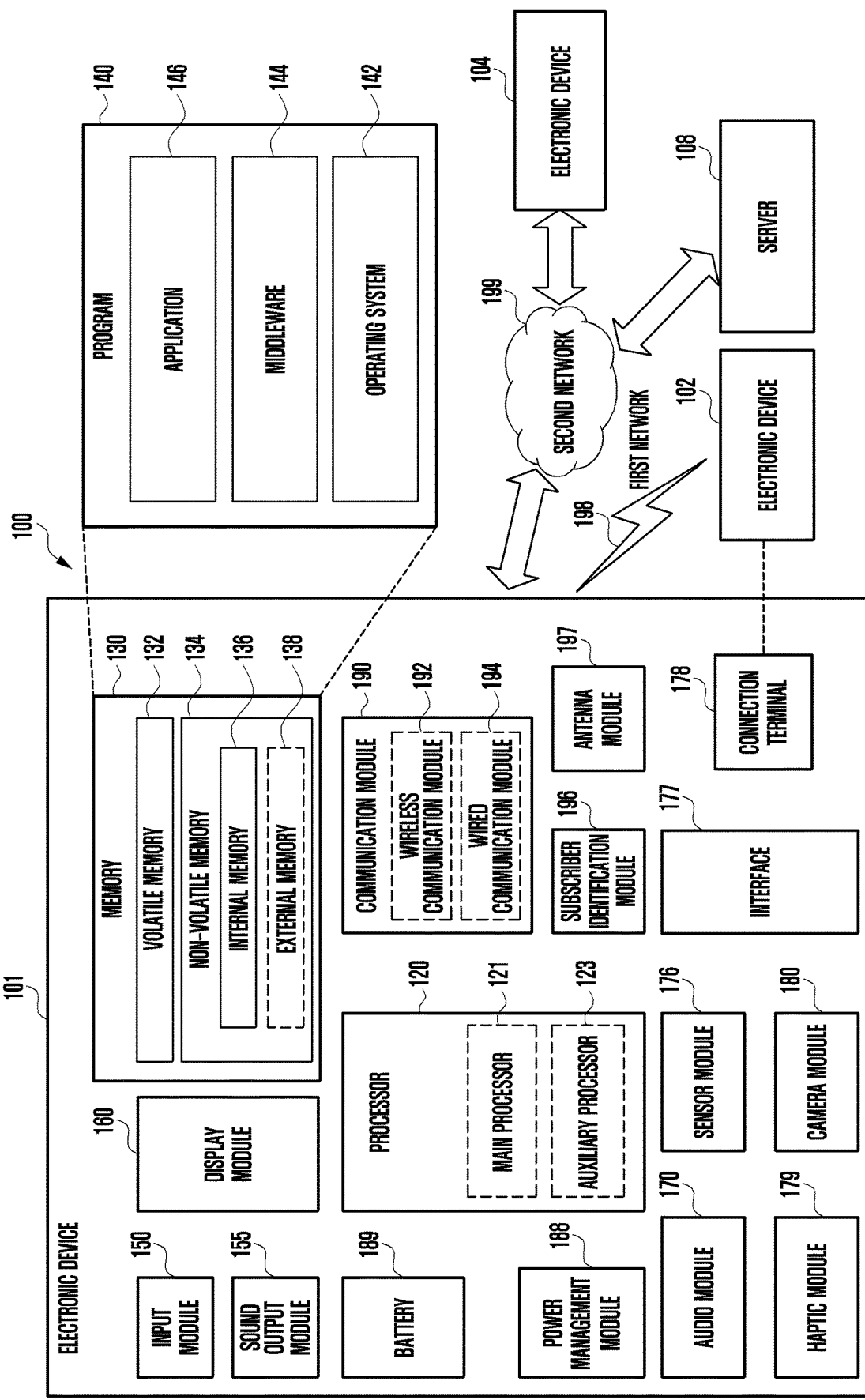
FIG. 1 is a block diagram illustrating an example electronic device in a network environment according to various embodiments.

It should be appreciated that various example embodiments of the present disclosure and the terms used therein are not intended to limit the technological features set forth herein to particular embodiments and include various changes, equivalents, or replacements for a corresponding embodiment.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semisupervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
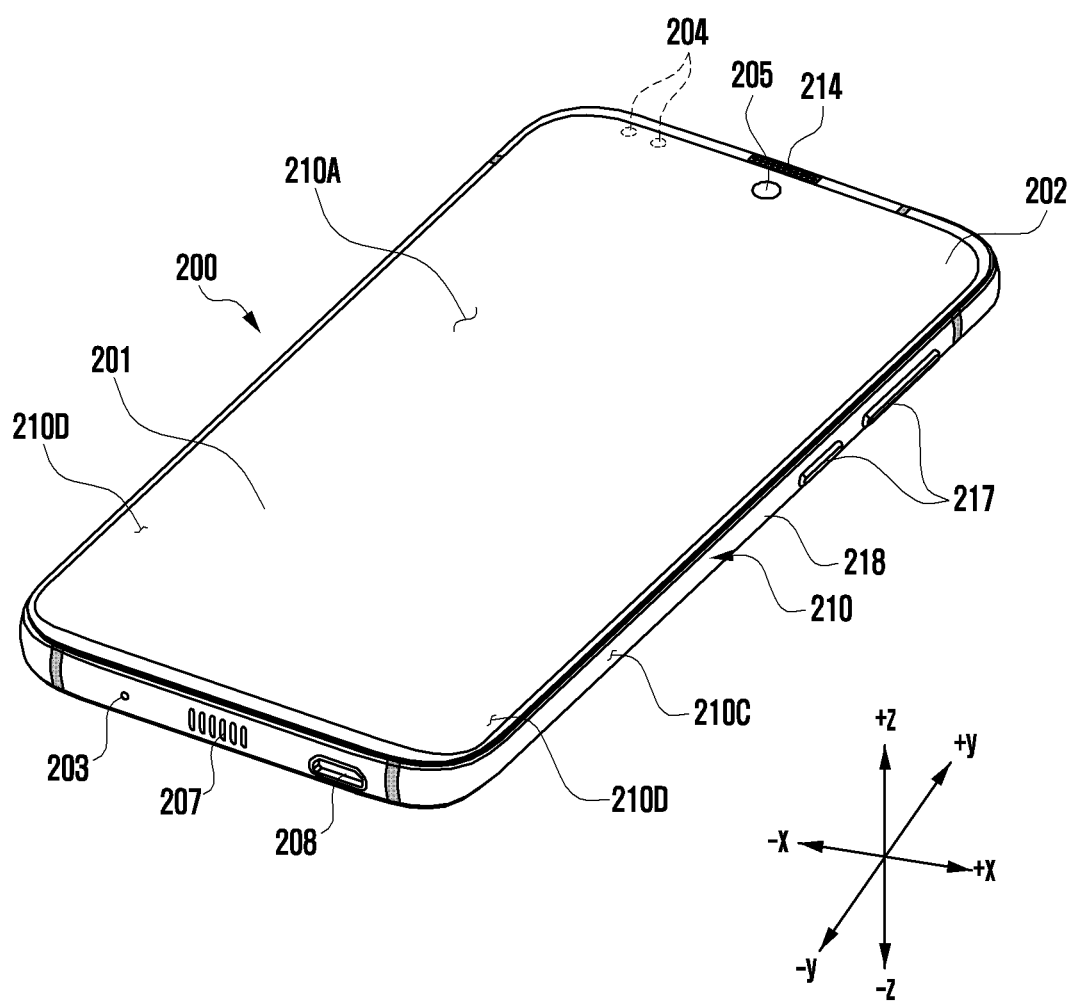
FIG. 2A is a front perspective view of an electronic device according to various embodiments.
Figure 2B:
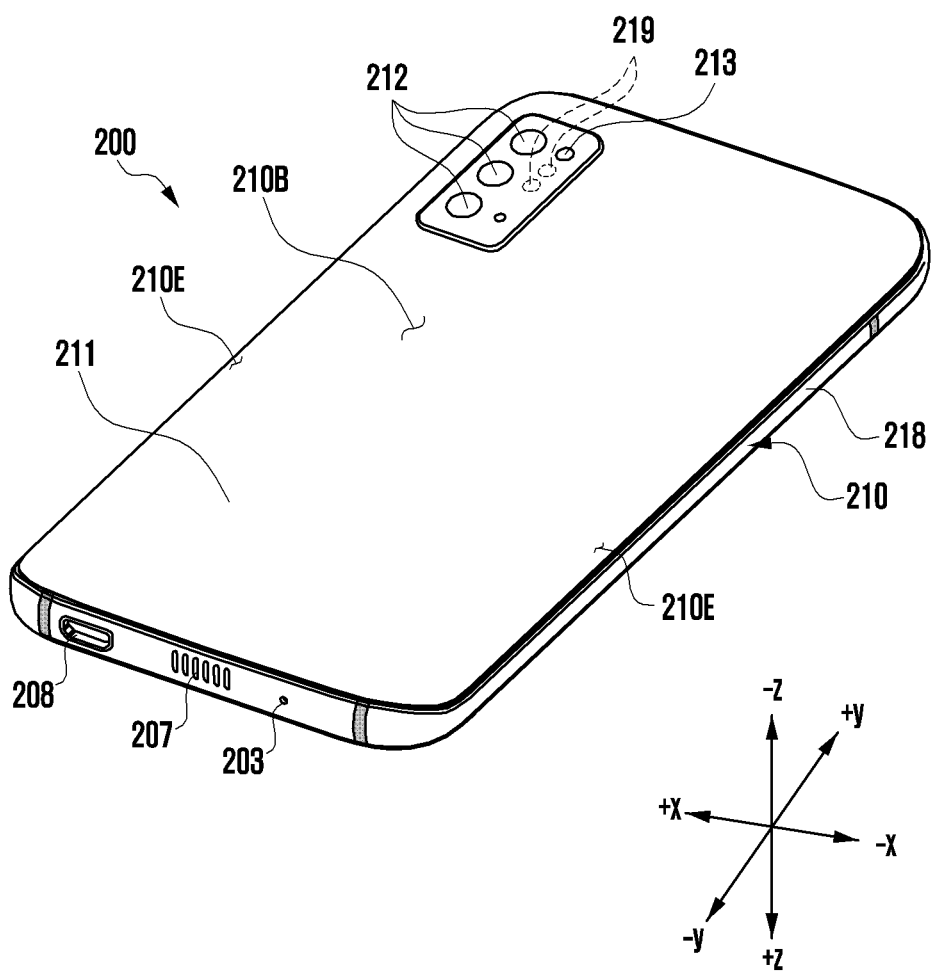
FIG. 2B is a rear perspective view illustrating the electronic device of FIG. 2A, according to various embodiments.

FIG. 2A is a front perspective view of an electronic device according to various embodiments. FIG. 2B is a rear perspective view of the electronic device of FIG. 2A according to various embodiments.

The electronic device 200 to be described below may include at least one of the components of the electronic device 101 described above with reference to FIG. 1.

With reference to FIG. 2A and FIG. 2B, the electronic device 200 according to an embodiment may include a housing 210 that includes a first surface (or front surface) 210A, a second surface (or rear surface) 210B, and a side surface 210C surrounding a space between the first surface 210A and the second surface 210B. In an embodiment (not shown), the housing 210 may refer to a structure forming a part of the first surface 210A, the second surface 210B, and the side surface 210C in FIG. 2A. According to an embodiment, the first surface 210A may be formed by a front plate 202 (e.g., glass plate or polymer plate including various coating layers) whose at least a portion is substantially transparent. The second surface 210B may be formed by a rear plate 211 that is substantially opaque. The rear plate 211 may be formed by, for example, coated or tinted glass, ceramic, polymer, metal (e.g., aluminum, stainless steel (STS), or magnesium), or a combination of at least two thereof. The side surface 210C may be formed by a side bezel structure (or "side member") 218 coupled to the front plate 202 and the rear plate 211 and including a metal and/or a polymer. In a certain embodiment, the rear plate 211 and side bezel structure 218 may be integrally formed and include the same material (e.g., metal material such as aluminum).

In the illustrated embodiment, the front plate 202 may include a first region 210D that is curved and seamlessly extended from the first surface 210A toward the rear plate at opposite ends of the longer edge of the front plate 202. In the illustrated embodiment (see FIG. 2B), the rear plate 211 may include a second region 210E that is curved and seamlessly extended from the second surface 210B toward the front plate 202 respectively at opposite ends of the longer edge. In a certain embodiment, the front plate 202 or the rear plate 211 may include only one of the first region 210D and the second region 210E. In a certain embodiment, the front plate 202 may not include the first region and the second region, but may include only a flat surface disposed parallel to the second surface 210B. In the above embodiments, when the electronic device is viewed from the side thereof, the side bezel structure 218 may have a first thickness (or width) on a side where the first region 210D or the second region 210E is not included, and may have a second thickness thinner than the first thickness on a side where the first region 210D or the second region 210E is included.

According to an embodiment, the electronic device 200 may include at least one or more of display 201, input device 203, sound output devices 207 and 214, sensor modules 204 and 219, camera modules 205 and 212, key input device 217, indicator (not shown), or connector 208. In a certain embodiment, at least one of the elements (e.g., key input device 217 or indicator) may be omitted from the electronic device 200, or another element may be added to the electronic device 200.

The display 201 may be exposed, for example, through a significant portion of the front plate 202. In a certain embodiment, at least a portion of the display 201 may be exposed through the front plate 202 forming the first surface 210A and the first region 210D of the side surface 210C. The display 201 may be coupled to or disposed adjacent to a touch sensing circuit, a pressure sensor capable of measuring the intensity (pressure) of a touch, and/or a digitizer that detects a magnetic field type stylus pen. In a certain embodiment, at least some of the sensor modules 204 and 219, and/or at least some of the key input devices 217 may be disposed on the first region 210D and/or the second region 210E. The input device 203 may include a microphone 203. In a certain embodiment, the input device 203 may include a plurality of microphones 203 arranged to detect the direction of a sound. The sound output devices 207 and 214 may include speakers 207 and 214. The speakers 207 and 214 may include an external speaker 207 and a call receiver 214. In a certain embodiment, the microphone 203, the speakers 207 and 214, and the connector 208 may be at least partially disposed in the internal space of the electronic device 200, and may be exposed to the external environment through at least one hole formed in the housing 210. In a certain embodiment, the hole formed in the housing 210 may be commonly used for the microphone 203 and the speakers 207 and 214. In a certain embodiment, the sound output devices 207 and 214 may include a speaker (e.g., piezo speaker) that operates in isolation from the hole formed in the housing 210.

The sensor modules 204 and 219 may generate an electrical signal or a data value corresponding to an internal operating state of the electronic device 200 or an external environmental state. The sensor modules 204 and 219 may include, for example, a first sensor module 204 (e.g., proximity sensor) and/or a second sensor module (not shown) (e.g., fingerprint sensor) disposed on the first surface 210A of the housing 210, and/or a third sensor module 219 (e.g., HRM sensor) disposed on the second surface 210B of the housing 210. The fingerprint sensor may be disposed on the first surface 210A (e.g., home key button) of the housing 210, on a portion of the second surface 210B, and/or under the display 201. The electronic device 200 may further include a sensor module which is not shown, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, a proximity sensor, or an illuminance sensor.

The camera modules 205 and 212 may include a first camera module 205 disposed on the first surface 210A of the electronic device 200, a second camera module 212 disposed on the second surface 210B, and/or a flash 213. The camera modules 205 and 212 may include one or plural lenses, an image sensor, and/or an image signal processor. The flash 213 may include, for example, a light emitting diode or a xenon lamp. In a certain embodiment, two or more lenses (wide-angle lens, ultra-wide-angle lens, or telephoto lens) and image sensors may be arranged in one surface of the electronic device 200.

The key input devices 217 may be arranged in the side surface 210C of the housing 210. In an embodiment, the electronic device 200 may not include some or all of the above-mentioned key input devices 217, and a key input device 217 not included may be implemented on the display 201 in a different form such as a soft key. In an embodiment, the key input devices 217 may be implemented using a pressure sensor included in the display 201.

The indicator may be disposed on, for example, the first surface 210A of the housing 210. The indicator may provide, for example, state information of the electronic device 200 in a light form (e.g., light emitting element). In an embodiment, the light emitting element may provide a light source interacting with, for example, the operation of the camera module 205. The indicator may include, for example, an LED, an IR LED, and/or a xenon lamp. The connector holes 208 may include a first connector hole 208 capable of accepting a connector (e.g., universal serial bus (USB) connector) for transmitting and receiving power and/or data to and from an external electronic device, and/or a second connector hole (e.g., earphone jack) (not shown) capable of accepting a connector for transmitting and receiving an audio signal to and from an external electronic device.

Some of the camera modules 205 and 212, some of the sensor modules 204 and 219, or the indicator may be disposed to be exposed through the display 201. For example, the camera module 205, the sensor module 204, or the indicator may be arranged in the internal space of the electronic device 200 so as to be in contact with the external environment through an opening of the display 201 perforated up to the front plate 202 or a transmissive region. According to an embodiment, the region in which the display 201 and the camera module 205 face each other may be formed as a transmissive region having a preset transmittance as a part of the content display area. According to an embodiment, the transmissive region may be formed to have a transmittance in a range of about 5 percent to about 20 percent. This transmissive region may include a region overlapping an effective area (e.g., angle-of-view area) of the camera module 205 through which light passes for image generation with an image formed by an image sensor. For example, the transmissive region of the display 201 may include a region having a lower pixel density than surrounding regions. For example, the transmissive region may replace the opening. For example, the camera module 205 may include an under display camera (UDC). In an embodiment, a certain sensor module 204 may be disposed in the internal space of the electronic device so as to perform its function without being visually exposed through the front plate 202. For example, in this case, the region of the display 201 facing the sensor module may not need a perforated opening.

According to various embodiments, although the electronic device 200 has a bar-type or plate-type appearance, the disclosure is not limited thereto. For example, the illustrated electronic device 200 may be a part of a foldable electronic device, a slidable electronic device, a stretchable electronic device, and/or a rollable electronic device. "Foldable electronic device", "slidable electronic device", "stretchable electronic device", and/or "rollable electronic device" may refer, for example, to an electronic device having a display (e.g., display 330 in FIG. 3) that can be deformed by bending so that at least a portion of the display may be folded, wound or rolled, at least partially expanded in area, and/or accommodated inside the housing (e.g., housing 210 in FIGS. 2A and 2B). A foldable electronic device, a slidable electronic device, a stretchable electronic device, and/or a rollable electronic device can be used with an extended screen display area by unfolding the display or exposing a larger area of the display to the outside according to the needs of the user.

Figure 3:
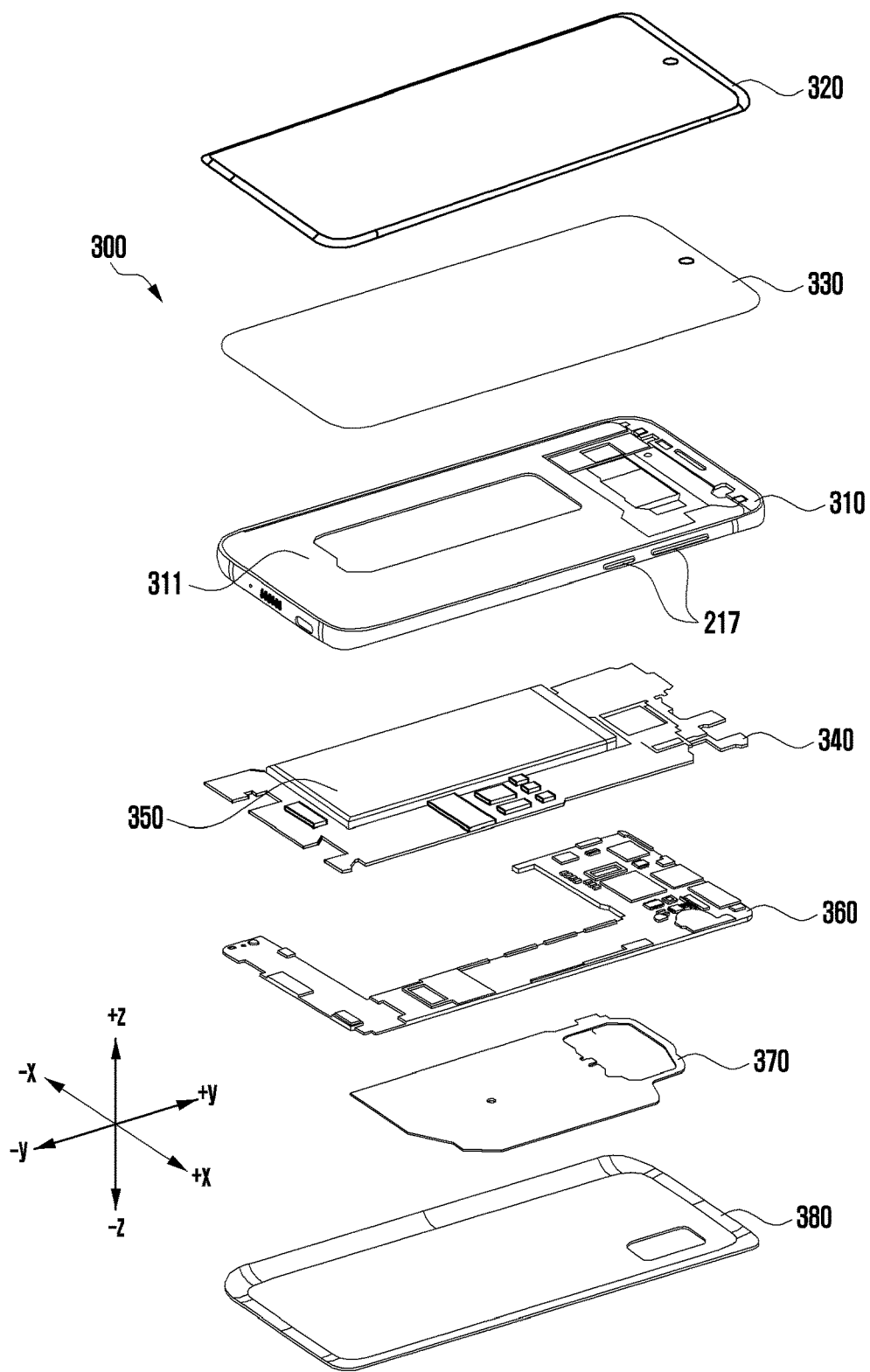
FIG. 3 is an exploded perspective view of the electronic device of FIG. 2A, according to various embodiments.

FIG. 3 is an exploded perspective view of the electronic device 200 of FIG. 2A according to various embodiments.

The electronic device 300 of FIG. 3 may be at least partially similar to the electronic device 200 of FIGS. 2A and 2B, or may include other embodiments of an electronic device. With reference to FIG. 3, the electronic device 300 (e.g., electronic device 200 in FIG. 2A or 2B) may include a side member 310 (e.g., side bezel structure), a first support member 311 (e.g., bracket or support structure), a front plate 320 (e.g., front cover), a display 330 (e.g., display 201 in FIG. 2A), a board 340 (e.g., printed circuit board (PCB), flexible PCB (FPCB), or rigid-flexible PCB (RFPCB)), a battery 350, a second support member 360 (e.g., rear case), an antenna 370, and a rear plate 380 (e.g., rear cover). In a certain embodiment, at least one of the components (e.g., first support member 311 or second support member 360) may be omitted from the electronic device 300 or other components may be additionally included therein. At least one of the components of the electronic device 300 may be the same as or similar to at least one of the components of the electronic device 200 of FIG. 2A or 2B, and repeated descriptions will be omitted below.

The first support member 311 may be disposed inside the electronic device 300 and may be connected to the side member 310 or may be integrally formed with the side member 310. The first support member 311 may be made of, for example, a metal material and/or a non-metal (e.g., polymer) material. The first support member 311 may have one surface coupled to the display 330 and the other surface coupled to the board 340. A processor, a memory, and/or an interface may be mounted on the board 340. The processor may include, for example, one or more of a central processing unit, an application processor, a graphics processing unit, an image signal processor, a sensor hub processor, and a communication processor.

The memory may include, for example, a volatile memory or a non-volatile memory. The interface may include, for example, a high definition multimedia interface (HDMI), a universal serial bus (USB) interface, an SD card interface, and/or an audio interface. The interface may, for example, electrically or physically connect the electronic device 300 to an external electronic device, and may include a USB connector, an SD card/MMC connector, or an audio connector.

The battery 350 is a device for supplying power to at least one component of the electronic device 300, and may include, for example, a non-rechargeable primary cell, a rechargeable secondary cell, or a fuel cell. At least a portion of the battery 350 may be disposed substantially coplanar with the board 340, for example. The battery 350 may be integrally disposed inside the electronic device 300. In an embodiment, the battery 350 may be disposed attachably and detachably with the electronic device 300. The antenna 370 may be disposed between the rear plate 380 and the battery 350. The antenna 370 may include, for example, a near field communication (NFC) antenna, a wireless charging antenna, and/or a magnetic secure transmission (MST) antenna. The antenna 370 may, for example, perform short-range communication with an external device or wirelessly transmit and receive power required for charging. In an embodiment, an antenna structure may be formed by a part of the side bezel structure 310 and/or the first support member 311 or a combination thereof.

Figure 4:
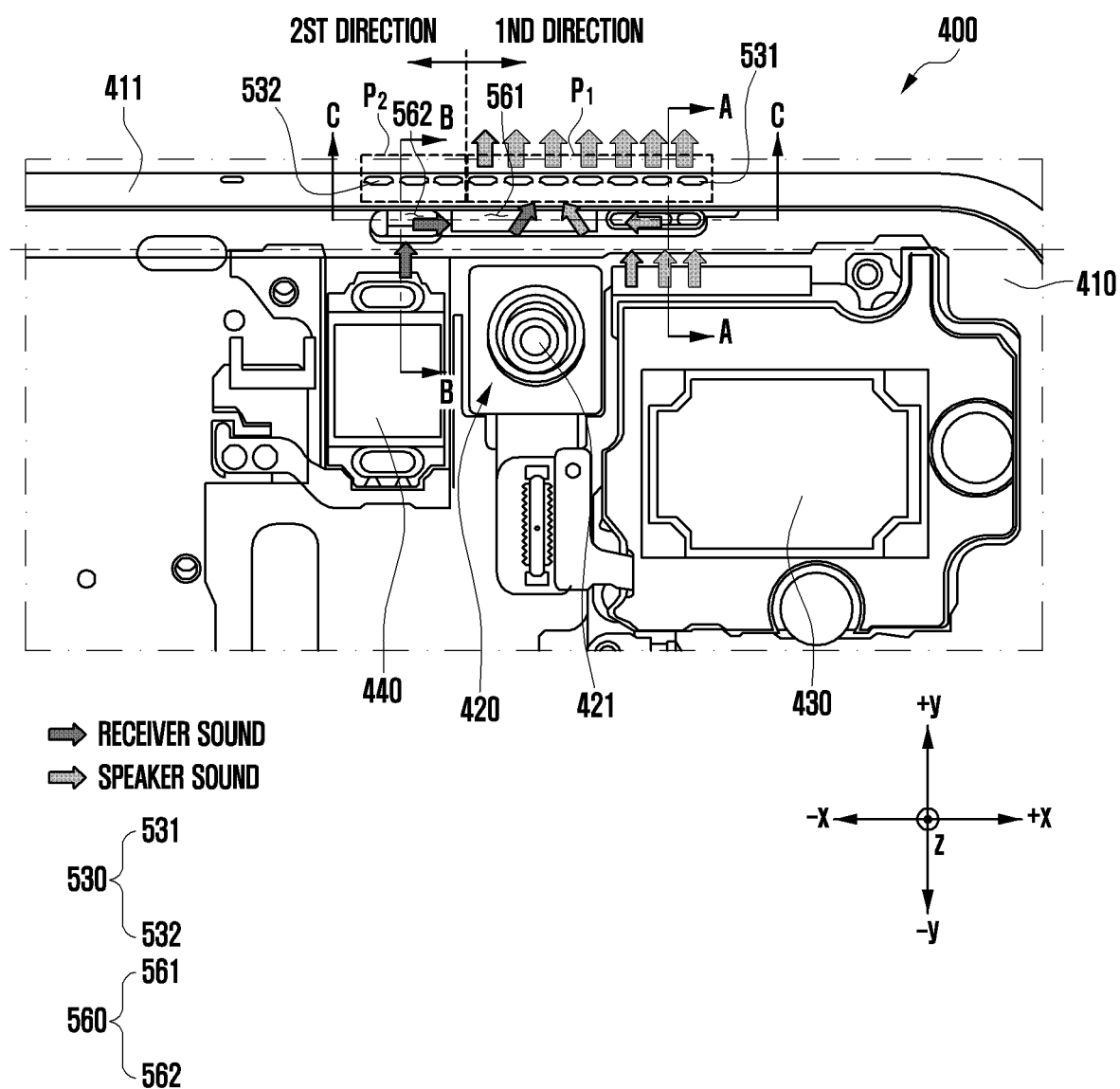
FIG. 4 is a diagram illustrating the upper end of the housing of the electronic device when viewed from the front side of the electronic device according to various embodiments.
Figure 5A:
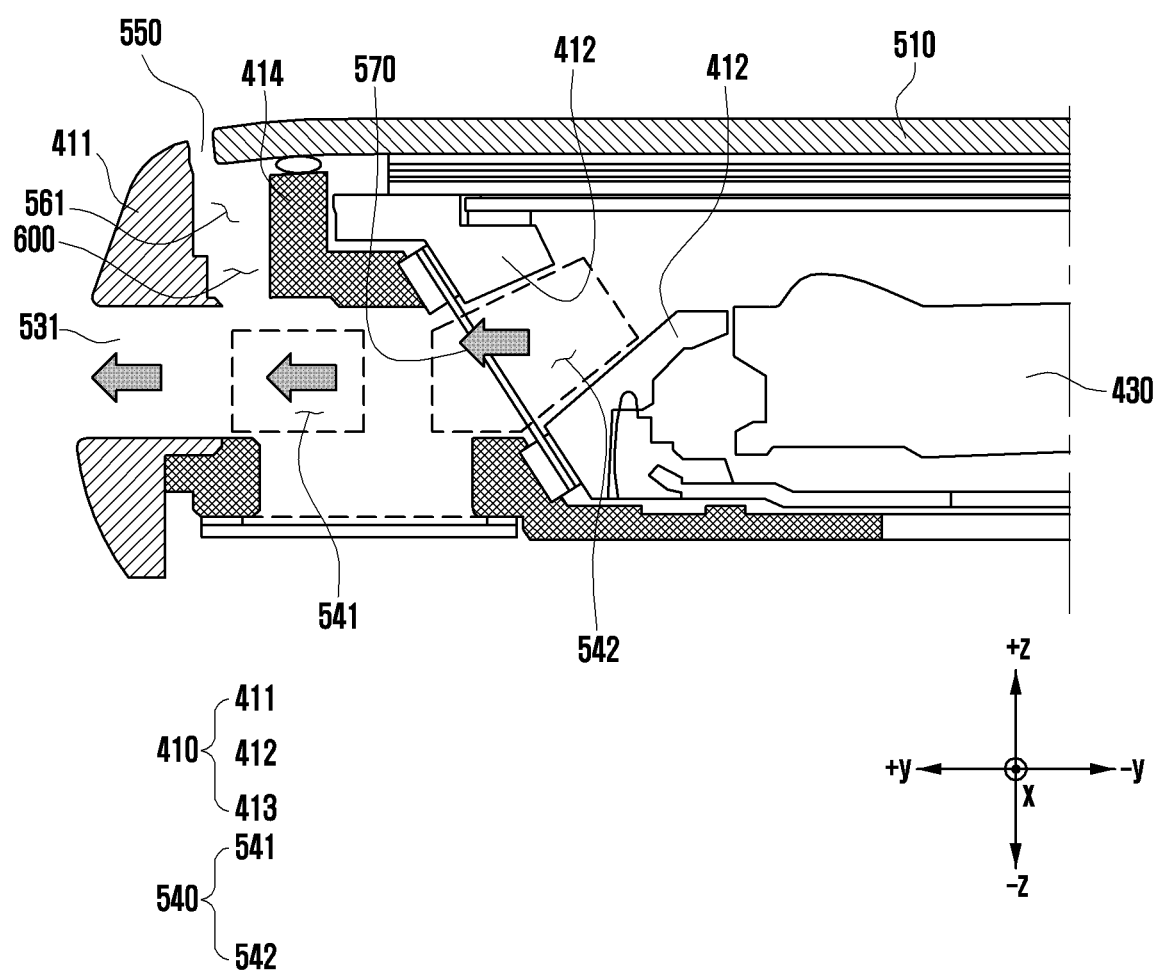
FIG. 5A is a cross-sectional view of the electronic device, taken along line A-A of FIG. 4 according to various embodiments.
Figure 5B:
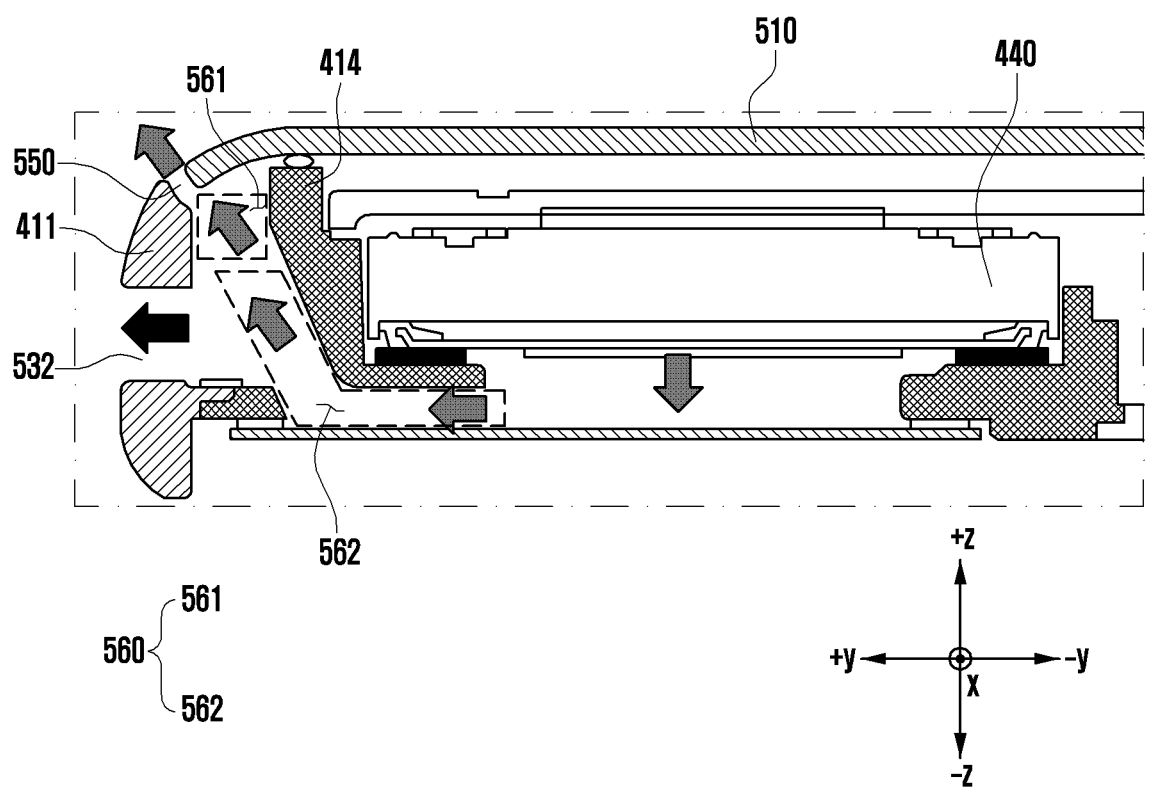
FIG. 5B is a cross-sectional view of the electronic device, taken along line B-B of FIG. 4 according to various embodiments.
Figure 5C:
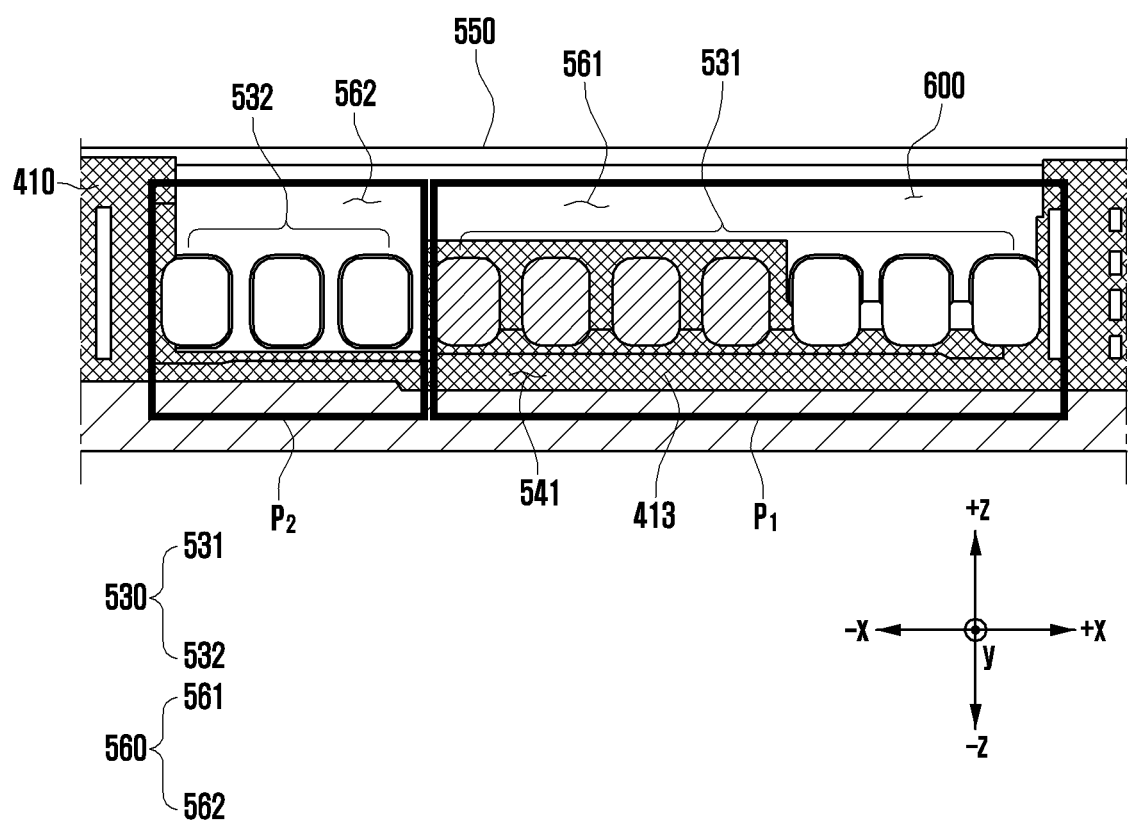
FIG. 5C is a cross-sectional view of the electronic device, taken along line C-C of FIG. 4 according to various embodiments.
Figure 6:
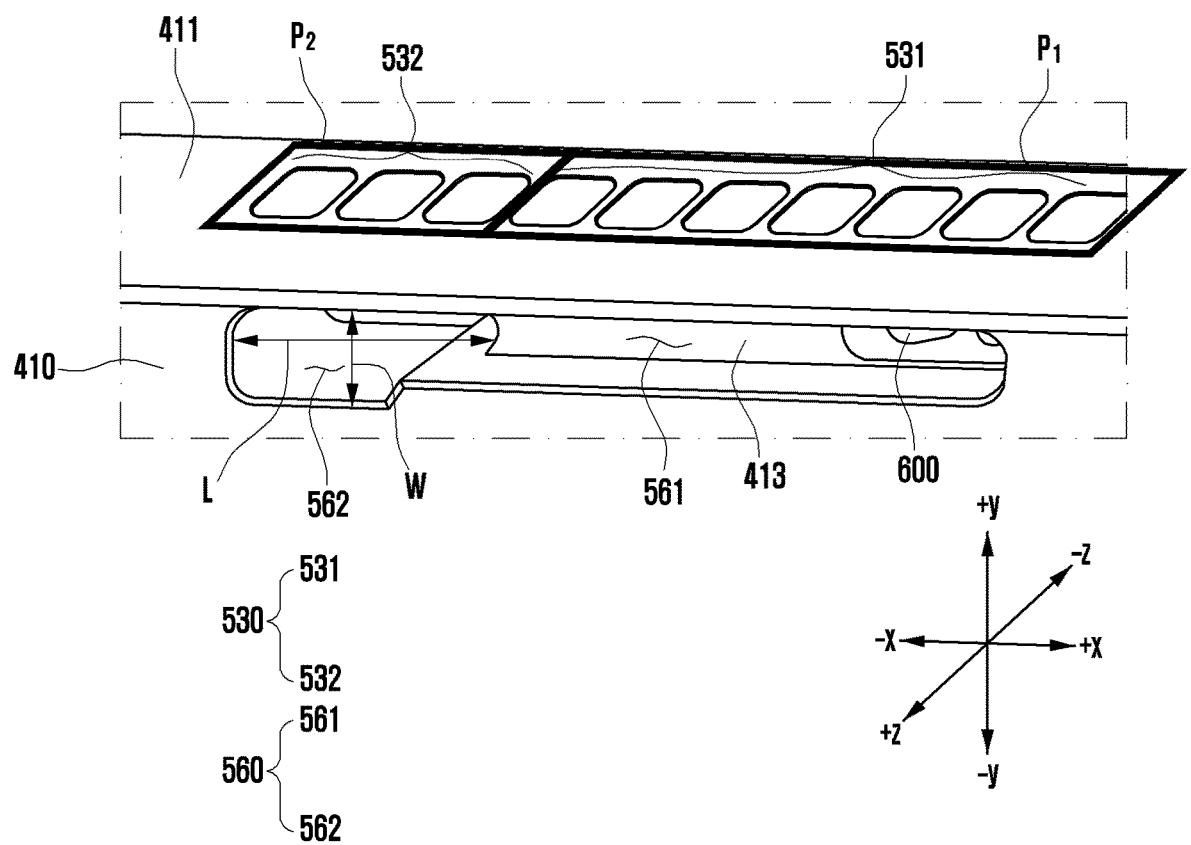
FIG. 6 is an enlarged perspective view illustrating a first sound conduit, a second sound conduit, and first sound holes according to various embodiments.

FIG. 4 is a diagram illustrating the upper end of the housing 410 of the electronic device 400 when viewed from the front side of the electronic device 400 according to various embodiments. FIG. 5A is a cross-sectional view of the electronic device 400, taken along line A-A of FIG. 4 according to various embodiments. FIG. 5B is a cross-sectional view of the electronic device 400, taken along line B-B of FIG. 4 according to various embodiments. FIG. 5C is a cross-sectional view of the electronic device 400, taken along line C-C of FIG. 4 according to various embodiments. FIG. 6 is an enlarged perspective view illustrating a first sound conduit 540, a second sound conduit 560, and first sound holes 530 according to various embodiments.

The electronic device 400 illustrated in FIG. 4 is an example of the electronic device 101 illustrated in FIG. 1, the electronic device 200 illustrated in FIGS. 2A and 2B, and/or the electronic device 300 illustrated in FIG. 3. Although the electronic device 400 described below is described with reference to a bar-type electronic device illustrated in FIGS. 2A, 2B, and 3, in various embodiments, the electronic device 400 may be a part of a foldable electronic device, a slidable electronic device, a stretchable electronic device, and/or a rollable electronic device. In addition, the same reference numerals are used for all components that are the same as or similar to those described in FIGS. 1, 2A, 2B, and 3, except where otherwise indicated.

According to various embodiments disclosed herein, the electronic device 400 may include a housing 410 (e.g., the housing 210 of FIGS. 2A and 2B) that supports various mechanical parts and various electronic components. The housing 410 may collectively refer to various mechanical parts that support various mechanical parts and various electronic components. Referring to FIGS. 4 and 5A, at least a portion of the housing 410 may include a side member 411 (e.g., the side member 310 in FIG. 3) that forms a side exterior of the electronic device 400, a first support structure 412 that supports a first speaker module 430, and a second support structure 414 disposed between the side member 411 and the first support structure 412. The housing 410 may have a shape symmetrical or partially asymmetrical with respect to a straight line in the longitudinal direction of the housing 410 (e.g., a straight line in the Y-axis direction with reference to FIG. 4). In addition, the housing 410 may have a shape symmetrical or partially asymmetrical with respect to a straight line in the width direction (e.g., a straight line in the X-axis direction with reference to FIG. 4). The housing 410 may be formed of various materials. For example, the front cover 201, the rear cover 202, and the side member 203 may be formed of a metal material and/or a non-metal material. The metal material may include an alloy of aluminum, stainless steel (STS, SUS), iron, magnesium, and/or titanium, and the non-metal material may include a synthetic resin, ceramic, and/or engineering plastic. In addition, the housing 410 may be formed in various ways such as injection molding and die casting.

In an embodiment, a printed circuit board (PCB) (e.g., the board 340 in FIG. 3) may be disposed in the housing 410. Electronic components disposed in the housing 410 may be electrically connected to the printed circuit board to operate. For example, a first speaker module 430 (e.g., the sound output module 155 in FIG. 1 or the sound output device 214 in FIG. 2A), a second speaker module (not illustrated) (e.g., the sound output module 155 in FIG. 1 or the sound output device 207 in FIG. 2A), a receiver module 440 (e.g., the sound output module 155 in FIG. 1 or the sound output device 214 in FIG. 2A), and a camera module 420 (e.g., the camera module 180 in FIG. 1 or the first camera module 205 in FIG. 2A), which will be described later, may be electrically connected to the printed circuit board to operate. In various embodiments, the electronic components disposed in the housing 410 may be electrically connected to the printed circuit board via a flexible printed circuit board (FPCB) (e.g., the board 340 in FIG. 3). For example, one end of the flexible printed circuit board may be electrically connected to an electronic component, and the other end of the flexible printed circuit board may be connected to the printed circuit board. Accordingly, the electronic component and the printed circuit board may be electrically connected to each other.

According to various embodiments, the first speaker module 430 and the receiver module 440 may be disposed in the housing 410 of the electronic device 400. In an embodiment, referring to FIG. 4, the first speaker module 430 and the receiver module 440 may be disposed at the upper end of the housing 410. The first speaker module 430 may refer to a component that outputs sound according to a command of a processor when an application is executed. The receiver module 440 may refer to a component that outputs a call voice. In various embodiments, the receiver module 440 may be a component that outputs sound according to a command of a processor when an application is executed.

According to various embodiments, the first speaker module 430 and the receiver module 440 may be positioned adjacent to each other in the upper end of the housing 410. For example, referring to FIG. 4, the first speaker module 430 may be positioned in a first direction (e.g., in the +X direction with reference to FIG. 4) with respect to the camera module 420 disposed in the upper end center portion of the housing 410. The receiver module 440 may be positioned in a second direction (e.g., the -X direction with reference to FIG. 4) opposite to the first direction with respect to the camera module 420. In an embodiment, the first speaker module 430 and the receiver module 440 may be arranged opposite to those illustrated in FIG. 4. For example, the first speaker module 430 may be disposed in the second direction with respect to the camera module 420, and the receiver module 440 may be disposed in the first direction with respect to the camera module 420.

According to various embodiments, support structures that support various mechanical parts and electronic components may be disposed in the housing 410. For example, referring to FIG. 5A, a first support structure 412 may support the first speaker module 430. In an embodiment, the first support structure 412 may support at least one of the first speaker module 430, the receiver module 440, and/or the camera module 420. The first support structure 412 may include a groove configured to accommodate at least one of the first speaker module 430, the receiver module 440, and/or the camera module 420. In various embodiments, the first support structure 412 may be provided separately from the housing 410 and assembled to the housing 410. In an embodiment, the first support structure 412 may be configured integrally with the housing 410 to partition the internal space of the housing 410.

According to various embodiments, the electronic device 400 may include first sound holes 530 that correspond to a path through which the sound output from the first speaker module 430 is emitted to the outside of the electronic device 400. The first sound holes 530 may be provided in the side member 411 of the side exterior of the electronic device 400. In an embodiment, referring to FIG. 4, the first sound holes 530 may be provided in the side member 411 to be positioned in the upper end side surface of the electronic device 400. For example, a plurality of holes of the first sound holes 530 may be provided in the side member 411 in a direction parallel to the width direction of the electronic device 400 (e.g., the X-axis direction with reference to FIG. 4).

In an embodiment, as will be described later, the first sound holes 530 may be partitioned with reference to the camera module 420. For example, referring to FIG. 4, the first sound holes 530 may include connection holes 531 provided in a first area P1 of the side member 411 that is positioned in the first direction with respect to the camera module 420 and dummy holes 532 provided in a second area P2 of the side member 411 that is positioned in the second direction with respect to the camera module 420. The connection holes 531 may be in the form of holes or openings so that the sound output from the first speaker module 430 can be emitted to the outside of the electronic device 400. The dummy holes 532 may be provided in the form of concave grooves or openings, and may be closed by a separate mechanical part (e.g., the shield member 700 of FIG. 7B). In various embodiments, the first sound holes 530 may include only the connection holes 531. Accordingly, the sound output from the first speaker module 430 may be emitted to the outside of the electronic device 400 through the first sound holes 530.

In an embodiment, a partition wall portion 413 that partitions the connection holes 531 of the first sound holes 530 and the dummy holes 532 of the first sound holes 530 may be provided inside the housing 410. The partition wall portion 413 may be a portion of the second support structure 414 of the housing 410. The partition wall portion 413 may block the sound output from the first speaker module 430 from being emitted to the outside of the electronic device 400 through the dummy holes 532. Accordingly, the sound output from the first speaker module 430 may be emitted to the outside of the electronic device 400 through the connection holes 531 rather than through the dummy holes 532.

According to various embodiments, as illustrated in FIGS. 4 and 5A, the electronic device 400 may include a first sound conduit 540 interconnecting the first sound holes 530 and the first speaker module 430. For example, the first sound conduit 540 may interconnect the connection holes 531 of the first sound holes 530 and the first speaker module 430. In an embodiment, the first sound conduit 540 may be provided in the housing 410 so that the sound output from the first speaker module 430 is transmitted to the connection holes 531 of the first sound holes 530. In various embodiments, the first sound conduit 540 may be a space formed by a plurality of mechanical parts of the housing 410. Here, the "conduit" may refer, for example, to a path guiding sound (sound wave). For example, the conduit may refer, for example, to a physical space. The conduit may include a space filled with a medium (e.g., air) capable of transmitting sound. Hereinafter, when sound is transmitted through a conduit, it may refer, for example, to the sound being transmitted via a specific space.

In an embodiment, referring to FIG. 5A, the first sound conduit 540 may include a first conduit 541 extending in parallel to the direction in which the first sound holes 530 are arranged (e.g., the X-axis direction with reference to FIG. 5A) and a second conduit 542 extending in the Y-axis direction with reference to FIG. 5A to interconnect the first speaker module 430 and the first conduit 541. Referring to FIG. 5A, the second conduit 542 may be a space provided in the first support structure 412 disposed in the housing 410. For example, the second conduit 542 may be a conduit provided in the first support structure 412 to be inclined with reference to the Y axis illustrated in FIG. 5A.

In an embodiment, as described above, the first sound holes 530 may include connection holes 531 through which the sound substantially output from the first speaker module 430 is emitted to the outside of the electronic device 400. The first sound conduit 540 may interconnect the connection holes 531 of the first sound holes 530 and the first speaker module 430. In this case, the sound output from the first speaker module 430 may be emitted to the outside of the electronic device 400 via the second conduit 542 including a guide surface 412, the first conduit 541, and the connection holes 531 of the first sound holes 530. However, the above-described first conduit 541 and second conduit 542 are merely conceptual terms used for describing the connection relationship between the first speaker module 430 and the connection holes 531, and actually, the first conduit 541 and the second conduit 542 may not be distinguished from each other on the first sound conduit 540.

According to various embodiments, the electronic device 400 may include a display module 510 (e.g., the display module 160 in FIG. 1, the display 201 in FIG. 2A, or the display 330 in FIG. 3). The display module 510 may be disposed on the front surface (e.g., the first surface (or front surface) 210A in FIG. 2A) of the housing 410. As described with reference to FIG. 2A, the display module 510 may include a camera hole 205 (e.g., the camera hole 205 in FIG. 2A) at least a portion of which includes a light transmitting area so that light can be transmitted through the camera lens 421 of the camera module 420. The camera lens 421 of the camera module 420 may face the camera hole 205 of the display module 510. In various embodiments, the camera hole 205 may be provided in the upper end center of the display module 510 in consideration of the aesthetics of the electronic device 400.

In an embodiment, the centers of the first sound holes 530 may be aligned with the camera hole 205. For example, the first sound holes 530 may be symmetrical with respect to a straight line passing through the camera hole 205 in the longitudinal direction of the electronic device 400 (e.g., the Y-axis direction with reference to FIG. 4). In various embodiments, the center of the first sound holes 530 may be aligned with the center of the housing 410 in the width direction (e.g., the X-axis direction with reference to FIG. 4).

In an embodiment, a plurality of speaker modules may be disposed in the housing 410 of the electronic device 400. For example, the first speaker module 430 may be disposed in the upper end of the housing 410, and the second speaker module may be disposed in the lower end of the housing 410. The second speaker module may refer to a component that outputs sound according to a command of a processor when an application is executed. The electronic device 400 may include third sound holes (not illustrated) that correspond to a path through which the sound output from the second speaker module is emitted to the outside of the electronic device 400. The third sound holes may be provided in the side member 411 of the side exterior of the electronic device 400. For example, referring to FIG. 2A, the third sound holes may be provided in the side member 411 to be positioned in the lower end side surface of the electronic device 400. A plurality of holes of the third sound holes may be provided in the side member 411 in a direction parallel to the width direction of the electronic device 400 (e.g., the X-axis direction with reference to FIG. 4). The sound output from the second speaker module may move along a third sound conduit (not illustrated) interconnecting the second speaker module and the third sound hole, and may be emitted to the outside of the electronic device 400 through the third sound hole.

In an embodiment, the third sound holes may be positioned to be symmetrical to the first sound holes 530 with respect to a straight line in the width direction of the electronic device 400 (e.g., the X-axis direction with reference to FIG. 4) in consideration of the aesthetics of the electronic device 400. In this case, the centers of the third sound holes may be aligned with the camera hole 205 like the first sound holes 530. For example, the third sound holes may be symmetrical with respect to a straight line passing through the camera hole 205 in the longitudinal direction of the electronic device 400 (e.g., the Y-axis direction with reference to FIG. 4). In various embodiments, the center of the third sound holes may be aligned with the center of the housing 410 in the width direction (e.g., the X-axis direction with reference to FIG. 4).

According to various embodiments, the electronic device 400 may include a second sound hole 550 that is a path through which the sound output from the receiver module 440 is emitted to the outside of the electronic device 400. In an embodiment, the second sound hole 550 may refer to a space defined since the display module 510 disposed in the housing to be directed to the front surface of the electronic device 400 and the side member 411 of the housing 410 are spaced from each other. For example, referring to FIG. 5B, the second sound hole 550 may refer to a slit-shaped hole positioned between the display module 510 and the side member 411. The slit-shaped hole may be provided to extend in the X-axis direction illustrated in FIG. 5B. In an embodiment, the second sound hole 550 may be provided in the display module 510. For example, the second sound hole 550 may be provided in the upper end of the display module 510 so that the sound output from the receiver module 440 can be emitted to the outside of the electronic device 400.

In an embodiment, the user's ear may be close to the upper end center portion of the electronic device 400 in an operation in which the user holds the electronic device 400 to make a call. In this case, the second sound hole 550 may be positioned in the upper end center portion of the electronic device 400 so that a call voice can be efficiently transmitted to the user.

According to various embodiments, as illustrated in FIGS. 4 and 5B, the electronic device 400 may include a second sound conduit 560 interconnecting the second sound hole 550 and the receiver module 440. In an embodiment, the second sound conduit 560 may be provided in the housing 410 so that the sound output from the second speaker module 440 is transmitted to the second sound hole 550. In various embodiments, the second sound conduit 560 may be a space formed by a plurality of mechanical parts of the housing 410.

According to various embodiments, as illustrated in FIG. 5B, the second sound conduit 560 may include a connection conduit 561 extending in parallel with the direction in which the first sound holes 530 are arranged (e.g., the X-axis direction with reference to FIG. 4). For example, the connection conduit 561 may extend in the first direction with respect to the camera module 420. In various embodiments, referring to FIG. 4, the connection conduit 561 may face a portion of the side member 411. The second sound conduit 560 may include an extension conduit 562 extending from the receiver module 440 to the connection conduit 561 so that the sound output from the receiver module 440 is transmitted to the connection conduit 561. The sound output from the receiver module 440 may be emitted to the outside of the electronic device 400 via the extension conduit 562, the connection conduit 561, and the second sound hole 550. However, the above-described connection conduit 561 and extension conduit 562 are merely conceptual terms used for describing the connection relationship between the receiver module 440 and the second sound hole 550, and actually, the connection conduit 561 and the extension conduit 562 may not be distinguished from each other on the second sound path 560.

In an embodiment, at least a portion of the second sound conduit 560 may be positioned in the front direction (e.g., in the +Z direction with reference to FIG. 5B) from the rear surface of the electronic device 400 with respect to the first sound conduit 540. For example, referring to FIGS. 5A and 5B, the connection conduit 561 of the second sound conduit 560 may be positioned in the +Z direction with respect to the first conduit 541 of the first sound conduit 540 with reference to FIG. 5B. As illustrated in FIG. 5A, the connection conduit 561 of the second sound conduit 560 may be partitioned from the first conduit 541 of the first sound conduit 540 by the partition wall portion 413. In an embodiment, the connection conduit 561 may be positioned in the −Z direction with respect to the first conduit 541 with reference to FIG. 5B. In an embodiment, the connection conduit 561 may be positioned in the +Y direction or −Y direction with respect to the first conduit 541 with reference to FIG. 5B. The above-described positional relationship between the connection conduit 561 and the first conduit 541 is merely an example, and the positional relationship between the connection conduit 561 and the first conduit 541 is not limited. In addition, the positional relationship between the connection conduit 561 and the first conduit 541 may be variously modified within a range that is capable of being implemented by a person ordinarily skilled in the art.

According to various embodiments, as illustrated in FIG. 6, one end of the connection conduit 561 of the second sound conduit 560 may be wider than the other end of the connection conduit 561. For example, one end of the connection conduit 561 (e.g., the portion of the connection conduit 561 positioned in the −X direction with reference to FIG. 6) may be greater in width W and length L than the other end of the connection conduit 561 (e.g., the portion of the connection conduit 561 positioned in the X direction with reference to FIG. 6).

According to various embodiments, a foreign matter blocking member 570 may be disposed in each of the first sound holes 530 and the second sound hole 550. The foreign matter blocking member 570 may block introduction of foreign matter into the electronic device 400 from the outside of the electronic device 400. The foreign matter blocking member 570 may include fine holes formed so that the sound generated from a plurality of speaker modules and the receiver module 440 can be emitted to the outside of the electronic device 400. For example, the foreign matter blocking member may include a mesh structure. The foreign matter blocking member 570 may be disposed inside the electronic device 400 to cover the first sound holes 530 and the second sound hole 550. In various embodiments, referring to FIG. 5A, the foreign matter blocking member 570 may be disposed in the outlet portion of the second conduit 542 of the first sound conduit 540 to reduce foreign matter to be introduced into the first speaker module 430.

According to various embodiments disclosed herein, the first speaker module 430 may be disposed at a position eccentric from the upper end center portion of the housing 410. For example, since the first speaker module 430 is spaced apart in the first direction from the camera module 420 positioned in the upper end center portion of the housing 410, the first speaker module 430 may be eccentric in the first direction from the center portion of the housing 410. In this case, the first sound conduit 540 is designed to avoid a mechanical part disposed in the center portion of the housing 410 so that the volume of the first sound conduit 540 may be reduced. Accordingly, the speaker emission performance of the electronic device 400 by the first speaker module 430 may be deteriorated. In various embodiments disclosed herein, an additional path may be provided in addition to the path through which the sound output from the first speaker module 430 is emitted via the first sound conduit 540 and the connection holes 531 of the first sound holes 530. For example, the first sound conduit 540 and the second sound conduit 560 may be connected to each other. In this case, the sound output from the first speaker module 430 may be emitted to the outside of the electronic device 400 via the second sound conduit 560 and the second sound hole 550 in that order. Accordingly, since the additional path through which the sound output from the first speaker module 430 is emitted to the outside of the electronic device 400 is provided, the speaker emission performance of the electronic device 400 can be improved. Hereinafter, a structure in which the first sound conduit 540 and the second sound conduit 560 are connected will be described.

According to various embodiments, the first sound conduit 540 may be connected to the second sound conduit 560. In an embodiment, the first sound conduit 540 may be connected to the connection conduit 561 of the second sound conduit 560. For example, referring to FIGS. 5C and 6, the first sound conduit 540 may be connected to the connection conduit 561 of the second sound conduit 560 via the connection portion 600 positioned adjacent to the first speaker module 430. The connection portion 600 may be spaced apart in the first direction from the camera module 420, which is positioned in the upper end center portion of the housing 410, to be positioned adjacent to the first speaker module 430. The connection portion 600 may be provided in the housing 410 to extend in a third direction (e.g., a Z-axis direction with reference to FIG. 6) perpendicular to the first direction and the second direction. In various embodiments, the connection portion 600 may be a space defined by the mechanical parts disposed in the housing 410.

The connection portion 600 may interconnect the first conduit 541 of the first sound conduit 540 and the second sound conduit 560. When the connection portion 600 is positioned closer to the receiver module 440 than to the first speaker module 430, the first sound conduit 540 and the second sound conduit 560 may be connected to each other at a position adjacent to the receiver module 440. In this case, since the second sound conduit 560 is connected to the first sound conduit 540 via the connection portion 600, the second sound conduit 560 may be connected to the connection holes 531 of the first sound holes 530 which are connected to the first sound conduit 540. Accordingly, the sound output from the receiver module 440 may be emitted to the outside of the electronic device 400 through the connection holes 531 of the first sound holes 530 as well as the second sound hole 550. In this case, the user's call voice may be transmitted to another person, thereby infringing upon the user's privacy. According to various embodiments disclosed herein, the connection portion 600 may be positioned closer to the first speaker module 430 than the receiver module 440. The connection conduit 561 of the first sound conduit 540 and the second sound conduit 560 may be connected to each other via the connection portion 600 at a position closer to the first speaker module 430 than the receiver module 440. Accordingly, the sound output from the receiver module 440 may pass through the second sound conduit 560 to be emitted to the outside of the electronic device 400 through the second sound hole 550 adjacent to the receiver module 440 rather than through the connection portion 600.

In an embodiment, the connection portion 600 may interconnect the first conduit 541 of the first sound conduit 540 and the second sound conduit 560. For example, the connection portion 600 may be a portion extending in the third direction from the first conduit 541 of the first sound conduit 540 and connected to the connection conduit 561 of the second sound conduit 560. In various embodiments, the connection portion 600 may interconnect the second conduit 542 of the first sound conduit 540 and the connection conduit 561 of the second sound conduit 560.

The connection portion 600 described above is a conceptual term used for describing a portion in which the connection conduit 561 of the first sound conduit 540 and the second sound conduit 560 is connected, and actually, the connection portion 600 may be a configuration that is not distinguished on the first sound conduit 540 and the connection conduit 561. For example, the connection portion 600 may be a portion of at least one of the first sound conduit 540 and the connection conduit 561.

According to various embodiments disclosed herein, the first sound conduit 540 may be connected to the connection conduit 561 of the second sound conduit 560 via the connection portion 600 positioned in a portion adjacent to the first speaker module 430. The sound generated from the first speaker module 430 may be emitted to the outside of the electronic device 400 via the second conduit 542 of the first sound conduit 540, the first conduit 541 of the first sound conduit 540, and the connection holes 531 of the first sound holes 530 in that order. In addition, the sound generated from the first speaker module 430 may be emitted to the outside of the electronic device 400 via the second conduit 542 of the first sound conduit 540, the first conduit 541 of the first sound conduit 540, the connection portion 600, the connection conduit 561 of the second sound conduit 560, and the second sound hole 550 in that order. Accordingly, since the sound generated from the first speaker module 430 is emitted through the connection holes 531 of the first sound holes 530 and the second sound hole 550, the speaker emission performance of the electronic device 400 can be improved.

According to various embodiments disclosed herein, the speaker emission performance of the electronic device 400 may be improved by increasing the number of holes of the first sound holes 530 or the third sound holes formed in the side member 411 of the housing 410. However, a greater amount of mechanical parts and electronic components may be disposed in the upper end of the housing 410 compared to the lower end of the housing 410. In this case, additionally providing the holes of the first sound holes 530 provided in the upper end of the side member 411 of the housing 410 may be limited in structure. For example, when the holes of the first sound holes 530 are additionally provided in the second direction with respect to the camera module 420, the added first sound holes 530 and the second sound conduit 560 may be connected and the sound output from the receiver module 440 may be emitted to the outside of the electronic device 400 through the added first sound holes 530. In contrast, relatively fewer mechanical parts and electronic components may be disposed in the lower end of the housing 410 compared to the upper end of the housing 410. Accordingly, holes of the third sound holes may be additionally provided in the lower end of the side member 411 of the housing 410. However, in terms of aesthetics of the electronic device 400, the first sound holes 530 and the third sound holes may be provided to be symmetrical with respect to a straight line in the width direction of the housing 410 (e.g., the X-axis direction with reference to FIG. 4). Accordingly, the number of third sound holes may depend on the number of first sound holes 530. According to various embodiments disclosed herein, it is possible to provide a method of additionally forming holes of the first sound holes 530 and the third sound holes. In addition, it is possible to provide a structure in which the sound output from the receiver module 440 is not emitted through the added holes of the first sound holes 530.

Figure 7A:
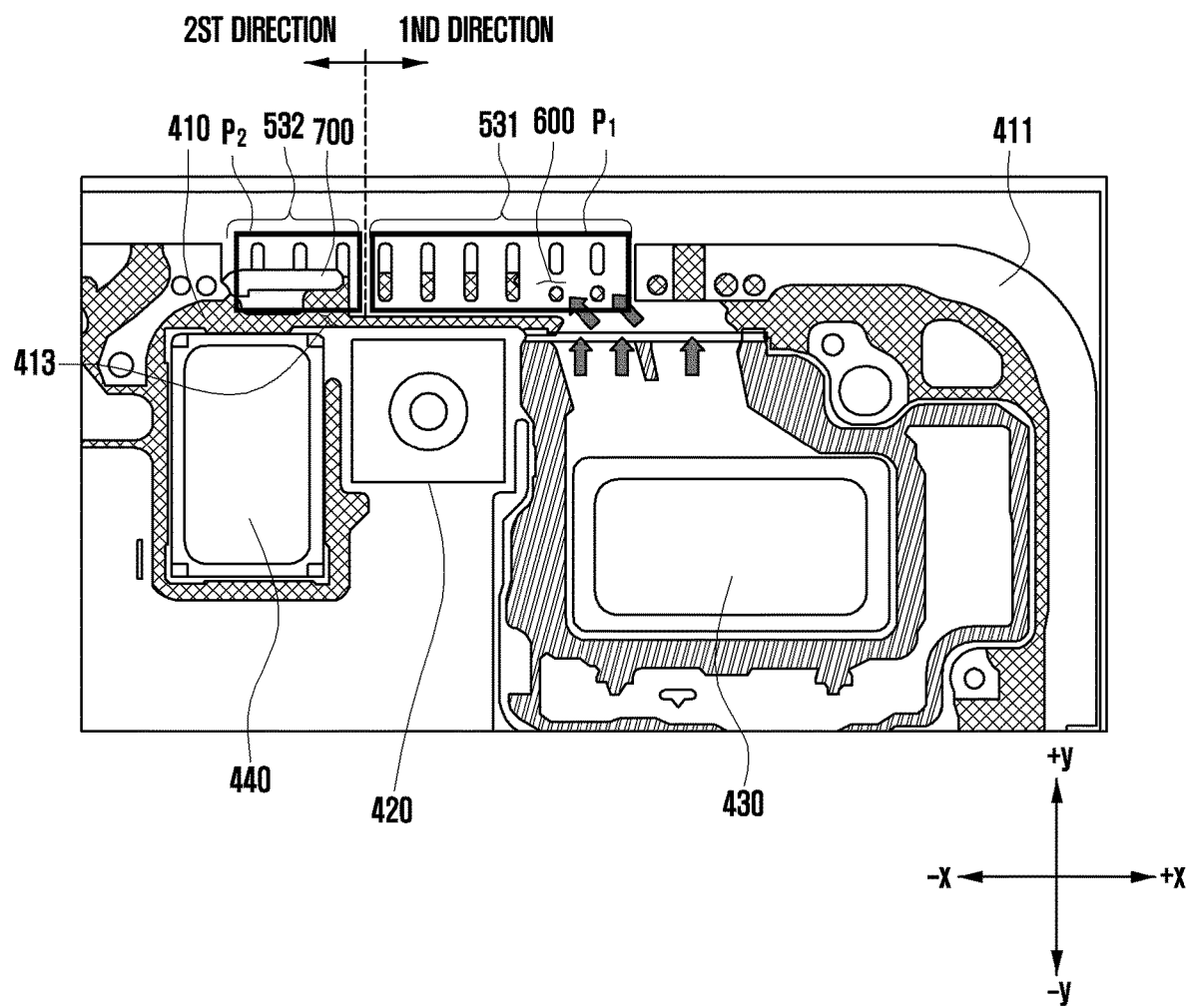
FIG. 7A is a diagram illustrating a state in which a shield member is disposed on the upper end of the housing of the electronic device, according to various embodiments.
Figure 7B:
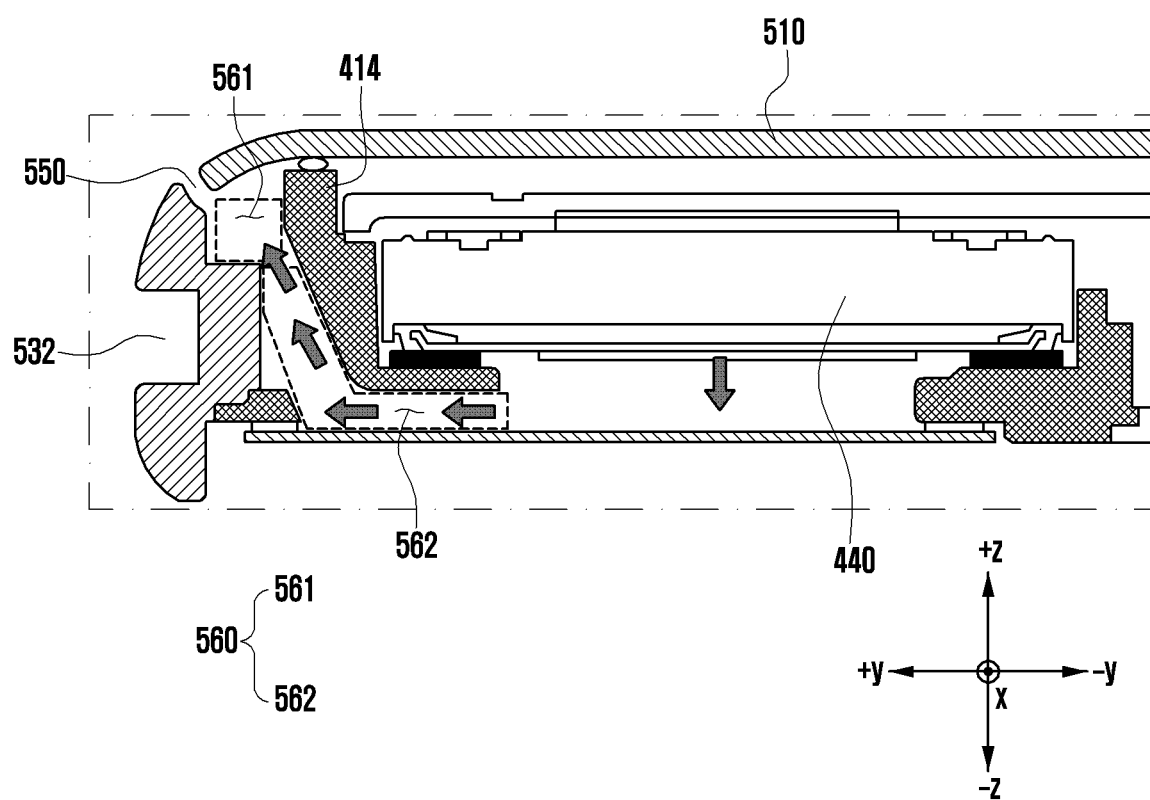
FIG. 7B is a cross-sectional view illustrating a state in which some of dummy holes are closed, according to various embodiments.
Figure 7C:
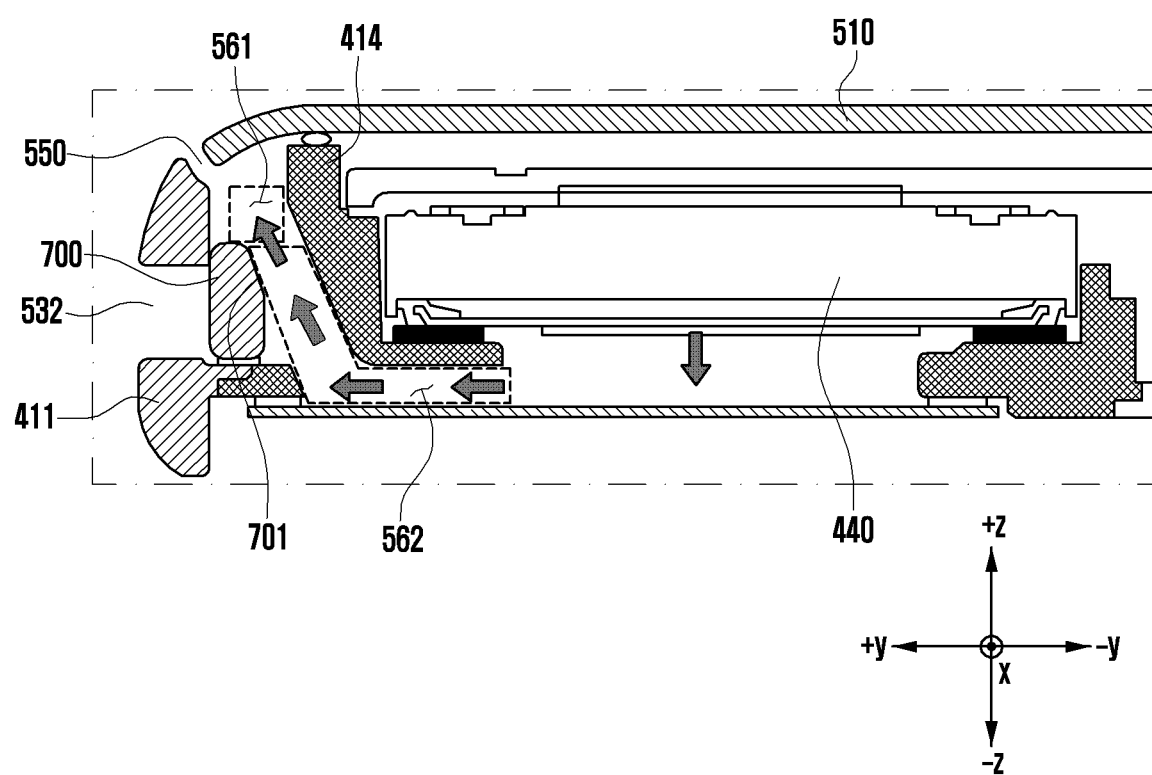
FIG. 7C is a cross-sectional view of a state in which a dummy hole is closed via the shield member according to various embodiments.
Figure 7D:
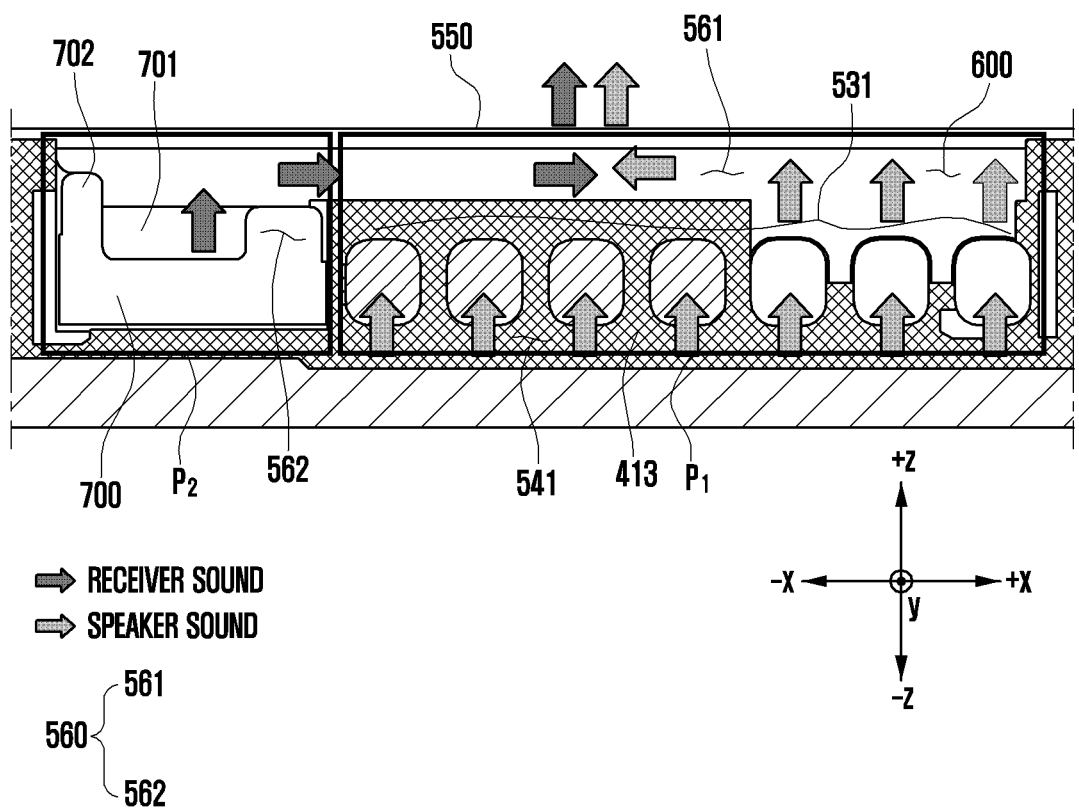
FIG. 7D is a cross-sectional view illustrating a state in which sound generated from the first speaker module and sound generated from the receiver module are emitted to the outside of the electronic device in a state in which the first sound conduit and the second sound conduit are connected to each other, according to various embodiments.
Figure 8A:
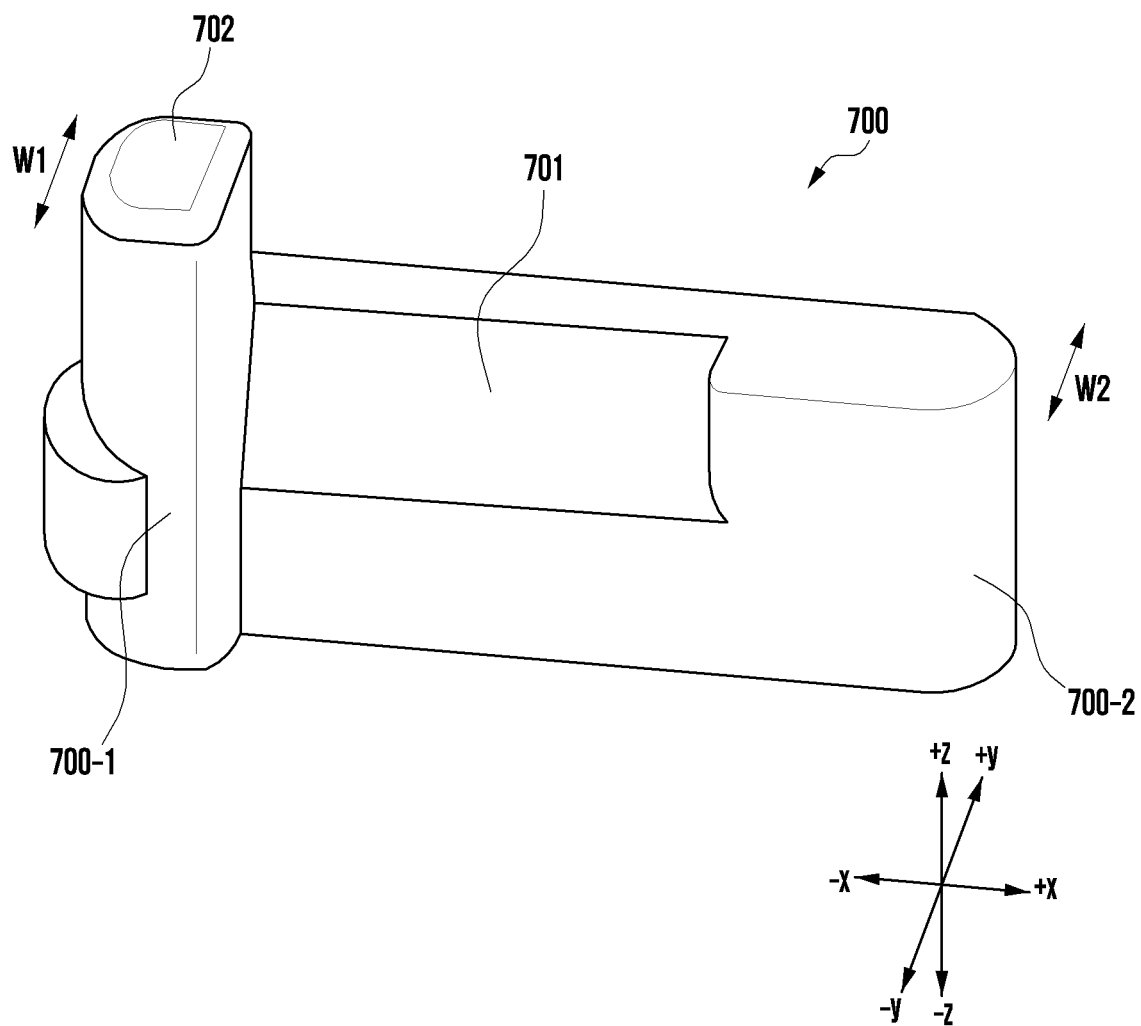
FIG. 8A is a perspective view illustrating a shield member according to various embodiments.
Figure 8B:
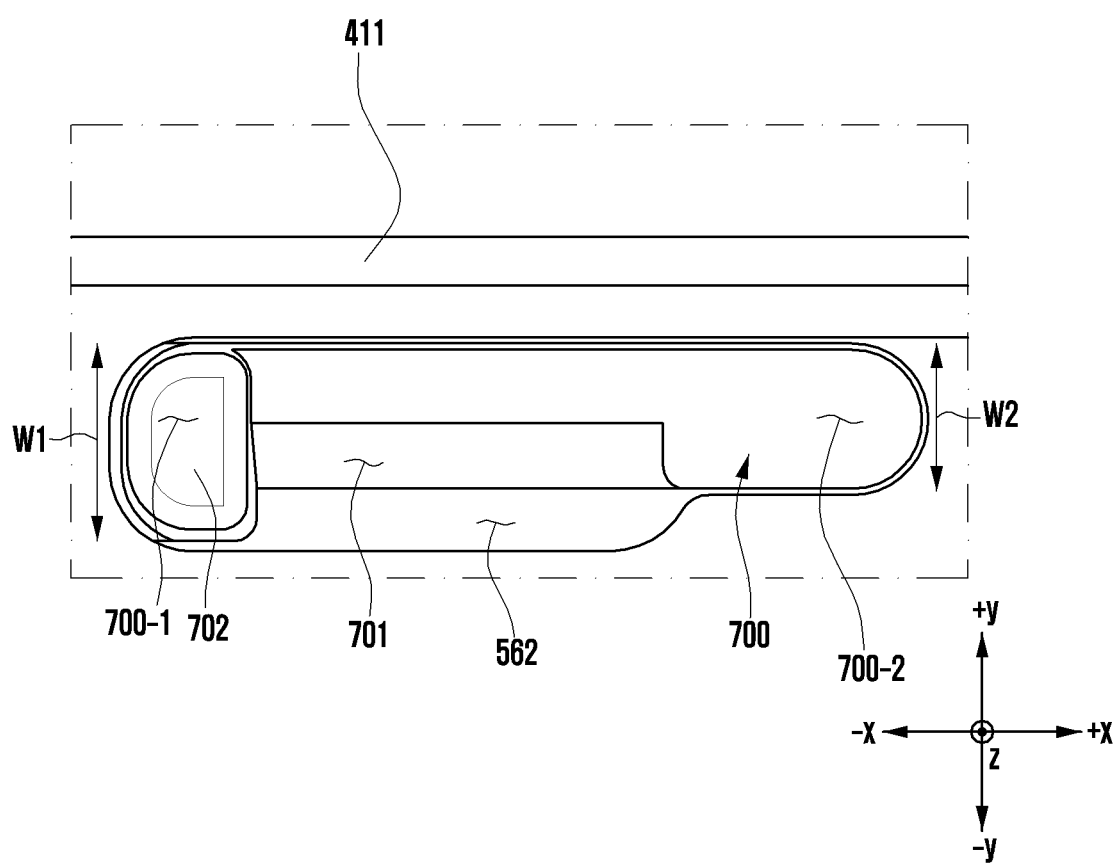
FIG. 8B is a diagram illustrating a state in which the shield member is disposed in the housing to close the dummy holes of the first sound holes according to various embodiments.

FIG. 7A is a diagram illustrating a shield member 700 is disposed in the upper end of the housing 410 of the electronic device 400 according to various embodiments. FIG. 7B is a cross-sectional view illustrating a state in which some of dummy holes 532 are closed, according to various embodiments. FIG. 7C is a cross-sectional view in which a dummy hole 532 is closed via the shield member 700 according to various embodiments. FIG. 7D is a cross-sectional view illustrating a state in which sound generated from the first speaker module 430 and sound generated from the receiver module 440 are emitted to the outside of the electronic device 400 in a state in which the first sound conduit 540 and the second sound conduit 560 are connected to each other, according to various embodiments. FIG. 8A is a perspective view illustrating a shield member 700 according to various embodiments. FIG. 8B is a diagram illustrating a state in which the shield member 700 is disposed in the housing 410 to close a dummy hole 532 of the first sound holes 530 according to various embodiments.

According to various embodiments, as illustrated in FIG. 7A, the first sound holes 530 may be partitioned with reference to a camera module 420 (e.g., the camera module 180 in FIG. 1 or the first camera module 205 in FIG. 2A). For example, the first sound holes 530 may include connection holes 531 provided in the first area P1 of the side member 411 positioned in the first direction illustrated in FIG. 7A with respect to the camera module 420 and dummy holes 532 provided in the second area P2 of the side member 411 positioned in the second direction illustrated in FIG. 7A with respect to the camera module 420. As described above, the connection holes 531 may be in the form of openings or holes formed such that the outside of the electronic device 400 and the inside of the electronic device 400 communicate with each other.

According to various embodiments, as illustrated in FIG. 7A, inside the housing 410 (e.g., the housing 210 in FIGS.

2A and 2B), a partition wall portion 413 partitioning the first area P1 and the second area P2 of the side member 411 (e.g., the side member 310 in FIG. 3) may be provided. The partition wall portion 413 may be a portion of the second support structure 414 of the housing 410. In an embodiment, the partition wall portion 413 may extend from at least a portion of the housing 410 in the third direction ((e.g., the +Z direction with reference to FIG. 6) to partition the connection holes 531 and the dummy holes 532 of the first sound holes 530. In addition, the partition wall portion 413 may extend in the width direction of the housing 410 (e.g., in the X-axis direction with reference to FIG. 7A) to partition the first conduit 541 of the first sound conduit 540 and the second connection conduit 561 of the second sound conduit 560. Accordingly, the first sound conduit 540 and the second sound conduit 560 may be connected only through the connection portion 600. The partition wall portion 413 may block the sound output from the first speaker module 430 (e.g., the sound output module 155 in FIG. 1 or the sound output device 214 in FIG. 2A) from being transmitted to the dummy holes 532 provided in the second area P2 of the side member 411. Accordingly, the sound output from the first speaker module 430 may be emitted to the connection holes 531 of the first sound holes 530, rather than to the dummy holes 532, due to the partition wall portion 413. In addition, the sound output from the first speaker module 430 may be emitted to the outside of the electronic device 400 via the second conduit 542 of the first sound conduit 540, the first conduit 541 of the first sound conduit 540, the connection portion 600, the connection conduit 561 of the second sound conduit 560, and the second sound hole 550 in that order. The partition wall portion 413 may block the sound output from the receiver module 440 from being emitted to the outside of the electronic device 400 through the connection holes 531 of the first sound holes 530 provided in the first area P1 of the side member 411. Accordingly, due to the partition wall portion 413, the sound output from the receiver module 440 (e.g., the sound output module 155 in FIG. 1 or the sound output device 214 in FIG. 2A) may not be emitted to the connection holes 531 of the first sound holes 530, but may be emitted to the outside of the electronic device 400 via the extension conduit 562 of the second sound conduit 560, the connection conduit 561 of the second sound conduit 560, the second sound hole 550.

According to various embodiments, the dummy holes 532 may be formed in various shapes in the second area P2 of the side member 411 of the housing 410. In an embodiment, the dummy holes 532 may be in a form in which the inside thereof is blocked. For example, referring to FIG. 7B, the dummy holes 532 may include grooves concavely formed in the side member 411 of the housing 410. In this case, the sound output from the receiver module 440 may not be emitted to the outside of the electronic device 400 through the dummy holes 532, but may be emitted to the outside of the electronic device 400 through the second sound hole 550.

According to various embodiments, the dummy holes 532 may be provided in the form of openings such that the inside of the electronic device 400 and the outside of the electronic device 400 are connected to each other. In this case, the connection conduit 561 of the second sound conduit 560 may be connected to the dummy holes 532. Accordingly, the sound generated from the receiver module 440 may be emitted to the outside of the electronic device 400 through the dummy holes 532 in addition to the second sound hole 550. Accordingly, a call voice may be transmitted to a person other than the user, thereby infringing on the user's privacy.

In order to solve this problem, a separate mechanical part for closing the dummy holes 532 may be disposed inside the housing 410. For example, referring to FIG. 8A, a shield member 700 for closing the dummy holes 532 may be disposed inside the housing 410. In various embodiments, referring to FIGS. 7C and 7D, at least a portion of the shield member 700 may be disposed on the connection conduit 561 of the second sound conduit 560 to close the dummy holes 532. According to various embodiments disclosed herein, since the dummy holes 532 are closed, the sound output from the receiver module 440 may not be emitted to the outside of the electronic device 400 through the dummy holes 532. Accordingly, the sound output from the receiver module 440 may be emitted to the outside of the electronic device 400 through the second sound hole 550 adjacent to the user's ear during a call.

In an embodiment, referring to FIGS. 7D and 8A, the shield member 700 may include a recess 701 formed by engraving so that the sound output from the receiver module 440 can be transmitted to the connection conduit 561 of the second sound conduit 561 via the extension conduit 562 of the second sound conduit 560. The recess 701 formed in the shield member 700 may extend from one end of the shield member 700 to the other end of the shield member 700. For example, the recess 701 provided in the shield member 700 may extend from one end of the shield member 700 positioned in the −Z direction to the other end of the shield member 700 positioned in the +Z direction with reference to FIG. 8A. Referring to FIG. 7D, the sound output from the receiver module 440 may be emitted to the outside of the electronic device 400 via the extension conduit 562 of the second sound conduit 560, the recess 701 provided in the shield member 700, the connection conduit 561 of the second shield member 700, and the second sound hole 550 in that order.

In an embodiment, referring to 7D and 8A, the shield member 700 may include a protrusion structure 702. The protrusion structure 702 provided on the shield member may be a structure protruding from one surface (e.g., a surface oriented in the +Z direction with reference to FIG. 8A) of the shield member 700. The shield member 700 may have one surface on which the protrusion structure 702 is provided and the other surface (e.g., the surface oriented in the −Z direction with reference to FIG. 8A) which is opposite to the one surface and is a flat surface. At least a portion of the shield member 700 may be disposed on the connection conduit 561 of the second sound conduit 560 and inserted into the housing in the direction from the front surface to the rear surface of the electronic 400 (e.g., the −Z direction with reference to FIG. 7B) to close the dummy holes 532. Referring to FIG. 7D, when inserted into the housing 410, the shield member 700 may be inserted such that the protrusion structure 702 provided thereon is directed to the front surface of the electronic device 400 (e.g., the surface oriented in the +Z direction with reference to FIG. 7D). The protrusion structure 702 provided on the shield member 700 may serve as a criterion for determining whether or not the other surface of the shield member 700 is first inserted into the housing 410.

In an embodiment, referring to FIGS. 8A and 8B, the shield member 700 may have a different width in the Y-axis direction with reference to FIG. 8A. For example, the width W1 of the one end 700-1 (e.g., the Y-axis direction width based on FIG. 8A) of the shield member 700 on which protrusion structure 702 is provided may be greater than the width W2 of the other end 700-2 (e.g., the width in the Y-axis direction with reference to FIG. 8A). A portion of the housing 410 in which the shield member 700 is seated may be configured to correspond to the shape of the shield member 700. For example, referring to FIG. 8B, the portion of the housing 410 in which one end 700-1 of the shield member 700 is disposed may have a width greater than the portion in which the other end 700-2 of the shield member 700 is disposed. Since the width W1 of the one end 700-1 and the width W2 of the other end 700-2 of the shield member 700 are different from each other, it is possible to determine whether the shield member 700 is inserted into the housing 410 in a desired direction during an assembly process. For example, referring to FIG. 8B, when the shield member 700 is inserted into the housing 410 such that the protrusion structure 702 is be directed to the rear surface (the side directed in the −Z direction with reference to FIG. 7D) of the electronic device 400, it may be impossible to insert the shield member 700 into the housing 410 since the width W1 of one end 700-1 of the shield member 700 is greater than the width of a portion of the housing 410 that corresponds to the width W2 of the other end 700-2 of the shield member 700. Accordingly, it is possible to determine whether the shielding member 700 is inserted into the housing 410 in a correct direction due to the width W1 of the one end 700-1 of the shield member 700 and the width W2 of the other end 700-2 of the shield member 700 which are different from each other in size.

Although not illustrated in the drawings, in an embodiment, the shield member 700 may be a portion of a mechanical part of the housing 410 of the electronic device 400. For example, the shield member 700 may be a portion of a rear case (e.g., the second support member 360 in FIG. 3) disposed to face the rear surface of the housing 410. A portion of the rear case disposed on the rear surface of the housing 410 may extend to the dummy holes 532 to close the dummy holes 532. In various embodiments, the shield member 700 may be a conceptual term referring to a portion of the housing 410 that closes the dummy holes 532. In addition, the dummy holes 532 provided in the side member 411 of the housing 410 may be closed in various ways in a range that is capable of being implemented by a person ordinarily skilled in the art, such as being closed via a separate mechanical part (e.g., the shield member 700) disposed inside the housing 410 or being closed by an extension of a mechanical part of the housing 410.

According to various embodiments, the shield member 700 may be formed of various materials. For example, the shield member may be formed of an elastic material, a metal material, or a non-metal material. The elastic material may be a material such as rubber or urethane. The metal material may include an alloy of aluminum, stainless steel (STS, SUS), iron, magnesium, titanium, or the like, and the non-metal material may include a synthetic resin, ceramic, or engineering plastic. In addition, the shield member 700 may be formed in various ways such as injection molding and die casting.

According to various embodiments disclosed herein, first sound holes 530 may be provided in the side member 411 of the housing 410, wherein the first sound holes 530 may include connection holes 531 provided in the first area P1 thereof and dummy holes 532 provided in the second area P2 thereof. The first sound conduit 540 may be connected to the connection conduit 561 of the second sound conduit 560 via the connection portion 600 positioned in a portion adjacent to the first speaker module 430. Referring to FIG. 7D, the sound output from the first speaker module 430 may be emitted to the outside of the electronic device 400 via the second conduit 542 of the first sound conduit 540, the first conduit 541 of the first sound conduit 540, and the connection holes 531 of the first sound holes 530 in that order. In addition, the sound output from the first speaker module 430 may be emitted to the outside of the electronic device 400 via the first sound conduit 540, the connection portion 600, the connection conduit 561 of the second sound conduit 560, and the second sound hole 550 in that order. Accordingly, since the path through which the sound output from the first speaker module 430 is emitted is added, the speaker emission performance of the electronic device 400 can be improved. Meanwhile, the dummy holes 532 may be formed in a concave groove shape or may be closed since the shield member 700 is disposed to cover the dummy holes 532. Therefore, the sound output from the receiver module 440 may be emitted to the outside of the electronic device 400 via the extension conduit 562 of the second sound conduit 560, the connection conduit 561 of the second sound conduit 560, and the second sound hole 550 in that order.

According to various embodiments disclosed herein, the speaker emission performance of the electronic device 400 may be improved by increasing the number of first sound holes 530 or the third sound holes formed in the side member 411 of the housing 410. Holes of the first sound holes 530 and the third sound holes may be additionally provided. For example, referring to FIGS. 5C and 6, in the side member 411 of the housing 410, dummy holes 532 arranged in parallel with the connection holes 531 of the first sound holes 530 may be provided. The dummy holes 532 may be provided to be located in the second direction (e.g., the −X direction with reference to FIG. 7A) with respect to the camera module 420 positioned in the upper end center portion of the housing 410. The dummy holes 532 may be provided in the second area P2 of the side member 411 facing the connection conduit 561 of the second sound conduit 560. When the dummy holes 532 are provided in the form of openings, the dummy holes 532 and the connection conduit 561 of the second sound conduit 560 may be connected to each other, so that the sound generated from the receiver module 440 can be emitted to the dummy hole 532. In this case, the user's call voice may be transmitted to another person, thereby infringing upon the user's privacy. Accordingly, the dummy holes 532 may be blocked by forming the dummy holes 532 in a closed shape or by disposing the shield member 700 in the dummy holes 532. Meanwhile, in order to secure the speaker emission performance of the electronic device 400, the connection holes 531 of the first sound holes 530 may be additionally provided in the first area P1 of the side member 411. The dummy holes 532 arranged in the second area P2 of the side member 411 may be additionally provided such that the centers of the first sound holes 530 can be aligned to the center of the width direction of the housing 410 (e.g., the X-axis direction with reference to FIG. 4). Since the connection holes 531 are additionally provided, the sound output from the first speaker module 430 can be emitted in a wider direction compared that from a conventional one.

Since the connection holes 531 are additionally provided or the dummy holes 532 are additionally provided, the number of first sound holes 530 may increase externally. The third sound holes may be provided to be symmetrical to the first sound holes 530 with reference to a straight line in the width direction of the housing 410 (e.g., the X-axis direction with reference to FIG. 7A) in consideration of the aesthetics of the electronic device 400. The number of third sound holes may be increased by the number of holes added to the first sound holes 530. Accordingly, since the number of holes in the third sound holes is increased, the sound generated from the second speaker module can be emitted in a wider direction than that in a conventional one.

According to various embodiments disclosed herein, one end of the connection conduit 561 of the second sound conduit 560 (e.g., a portion of the connection conduit 561 positioned in the −X direction with reference to FIG. 6) may be extended in the direction in which the dummy holes 532 are provided (e.g., the −X direction with reference to FIG. 6). For example, one end of the connection conduit 561 may be greater in width W and length L than the other end of the connection conduit 561 (e.g., the portion of the connection conduit 561 positioned in the X direction with reference to FIG. 6). Accordingly, the area for emitting the sound output from the receiver module 440 may be expanded, so that the receiver emission performance of the electronic device 400 can be improved.

An electronic device (e.g., the electronic device 101 in FIG. 1, the electronic device 200 in FIG. 2A, or the electronic device 300 in FIG. 3) according to various example embodiments disclosed herein may include: a housing (e.g., the housing 210 in FIGS. 2A and 2B), a camera module comprising a camera (e.g., the camera module 180 in FIG. 1 or the first camera module 205 in FIG. 2A) disposed in the housing, a speaker module comprising a speaker (e.g., the sound output module 155 in FIG. 1, the sound output module 214 in FIG. 2A, or the first speaker module 430 in FIG. 4) positioned in a first direction (e.g., the first direction illustrated in FIG. 4) with respect to the camera module, a receiver module comprising a receiver (e.g., the first sound output module 155 in FIG. 1 or the sound output device 214 in FIG. 2A) positioned in a second direction (e.g., the second direction illustrated in FIG. 2) opposite to the first direction with respect to the camera module, first sound holes including connection holes positioned in the first direction with respect to the camera module and a hole (e.g., the dummy hole 532 in FIG. 4) positioned in the second direction with respect to the camera module, the first sound holes being positioned on a side surface of the electronic device, a first sound conduit interconnecting the connection holes and the speaker module, a second sound hole positioned on a front surface (e.g., the surface oriented in the +Z direction with reference to FIG. 2A) of the electronic device, a second sound conduit including a connection conduit disposed in a third direction (e.g., the +Z direction with reference to FIG. 6) perpendicular to the first direction with respect to the first sound conduit, the second sound conduit interconnecting the second sound hole and the receiver module, and a connection portion interconnecting the first sound conduit and the connection conduit of the second sound conduit.

In addition, the connection portion may be positioned closer to the speaker module than to the receiver module.

In addition, the second sound conduit may be connected to the hole (e.g., the dummy hole 532 in FIG. 4) of the first sound hole, and the electronic device may further include a shield configured to close the hole (e.g., the dummy hole 532 in FIG. 4) of the first sound hole.

In addition, the shield may include a recess connected to the second sound conduit.

In addition, the shield may include a protrusion that protrudes from the rear surface of the electronic device toward the front surface (e.g., in the +Z direction with reference to FIG. 8A).

In addition, the second sound conduit may be connected to the hole (e.g., the dummy hole 532 in FIG. 4) of the first sound hole, and the hole (e.g., the dummy hole 532 in FIG. 4) is closed via a mechanical part of the housing.

In addition, the connection holes of the first sound holes may include an opening provided on a side surface of the housing, and the hole (e.g., the dummy hole 532 in FIG. 4) of the first sound holes includes a groove concavely formed on the side surface of the housing.

In addition, the connection conduit of the second sound conduit may extend in the first direction.

In addition, the connection portion may be provided in the housing to extend in the third direction.

In addition, the first sound conduit and the second sound conduit may be provided in the housing.

The electronic device may further include a display module comprising a display (e.g., the display module 160 in FIG. 1, the display 201 in FIG. 2A, or the display 330 in FIG. 3) disposed to be directed to a front surface of the housing, wherein the second sound hole may include a hole formed in a slit shape between the display module and the housing.

The electronic device may further include a display module comprising a display (e.g., the display module 160 in FIG. 1, the display 201 in FIG. 2A, or the display 330 in FIG. 3) including a camera hole (e.g., the camera hole 205 in FIG. 2A) configured to allow light to pass through a lens of the camera module, wherein the camera hole may be positioned in the upper end center of the display module, and centers of the first sound holes may be aligned with the camera hole.

The electronic device may further include a partition wall portion that partitions the first sound conduit and the connection conduit of the second sound conduit.

An electronic device (e.g., the electronic device 101 in FIG. 1, the electronic device 200 in FIG. 2A, or the electronic device 300 in FIG. 3) according to various example embodiments disclosed herein may include a housing (e.g., the housing 210 in FIGS. 2A and 2B), a camera module comprising a camera (e.g., the camera module 180 in FIG. 1 or the first camera module 205 in FIG. 2A) disposed in the housing, a speaker module comprising a speaker (e.g., the sound output module 155 in FIG. 1, the sound output module 214 in FIG. 2A, or the first speaker module 430 in FIG. 4) positioned in a first direction (e.g., the first direction illustrated in FIG. 4) with respect to the camera module, a receiver module comprising a receiver (e.g., the first sound output module 155 in FIG. 1 or the sound output device 214 in FIG. 2A) positioned in a second direction (e.g., the second direction illustrated in FIG. 4) opposite to the first direction with respect to the camera module, first sound holes positioned on a side surface of the housing, a first sound conduit interconnecting the first sound holes and the speaker module, a second sound hole positioned on a front surface (e.g., the surface oriented in the +Z direction with reference to FIG. 2A) of the housing, a second sound conduit including a connection conduit disposed in a third direction (e.g., the +Z direction with reference to FIG. 6) perpendicular to the first direction with respect to the first sound conduit, the second sound conduit interconnecting the second sound hole and the receiver module, and a connection portion interconnecting the first sound conduit and the connection conduit of the second sound conduit.

In addition, the connection portion may be positioned closer to the speaker module than to the receiver module.

In addition, the connection portion may be provided in the housing to extend in the third direction.

In addition, the connection conduit of the second sound conduit may extend in the first direction.

In addition, the first sound conduit and the second sound conduit may be provided in the housing.

The electronic device may further include a display module comprising a display (e.g., the display module 160 in FIG. 1, the display 201 in FIG. 2A, or the display 330 in FIG. 3) disposed to be directed to a front surface of the housing, wherein the second sound hole may include a hole formed in a slit shape between the display module and the housing.

The electronic device may further include a display module comprising a display (e.g., the display module 160 in FIG. 1, the display 201 in FIG. 2A, or the display 330 in FIG. 3) including a camera hole (e.g., the camera hole 205 in FIG. 2A) facing a lens of the camera module, wherein the camera hole may be positioned in the upper end center of the display module, and centers of the first sound holes may be aligned with the camera hole.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a housing;
a camera module comprising a camera disposed in the housing;
a speaker module comprising a speaker positioned in a first direction with respect to the camera module;
a receiver module comprising a receiver positioned in a second direction opposite to the first direction with respect to the camera module;
first sound holes including a connection hole positioned in the first direction with respect to the camera module and a hole positioned in the second direction with respect to the camera module, the first sound holes being positioned on a side surface of the electronic device;
a first sound conduit interconnecting the connection hole and the speaker module;
a second sound hole positioned on a front surface of the electronic device;
a second sound conduit including a connection conduit disposed in a third direction perpendicular to the first direction with respect to the first sound conduit, the second sound conduit interconnecting the second sound hole and the receiver module; and
a connection portion interconnecting the first sound conduit and the connection conduit of the second sound conduit.

2. The electronic device of claim 1, wherein the connection portion is positioned closer to the speaker module than to the receiver module.

3. The electronic device of claim 1, wherein the second sound conduit is connected to a hole of the first sound hole, and
the electronic device further comprises a shield closing the hole of the first sound hole.

4. The electronic device of claim 3, wherein the shield includes a recess connected to the second sound conduit.

5. The electronic device of claim 3, wherein the shield includes a protrusion protruding from a rear surface of the electronic device toward a front surface.

6. The electronic device of claim 1, wherein the second sound conduit is connected to the hole of the first sound hole, and
the hole is closed via a mechanical part of the housing.

7. The electronic device of claim 1, wherein the connection hole of the first sound holes includes an opening provided on a side surface of the housing, and
the hole of the first sound holes includes a groove concavely formed on the side surface of the housing.

8. The electronic device of claim 1, wherein the connection conduit of the second sound conduit extends in the first direction.

9. The electronic device of claim 1, wherein the connection portion is provided in the housing to extend in the third direction.

10. The electronic device of claim 1, wherein the first sound conduit and the second sound conduit are provided in the housing.

11. The electronic device of claim 1, further comprising:
a display module comprising a display disposed to be directed to a front surface of the housing,
wherein the second sound hole includes a hole formed in a slit shape between the display module and the housing.

12. The electronic device of claim 1, further comprising:
a display module comprising a display including a camera hole configured to allow light to pass through a lens of the camera module, wherein the camera hole is positioned in an upper end center of the display module, wherein
centers of the first sound holes are aligned with the camera hole.

13. The electronic device of claim 1, further comprising:
a partition wall portion partitioning the first sound conduit and the connection conduit of the second sound conduit.

14. An electronic device comprising:
a housing;
a camera module comprising a camera disposed in the housing;
a speaker module comprising a speaker positioned in a first direction with respect to the camera module;
a receiver module comprising a receiver positioned in a second direction opposite to the first direction with respect to the camera module;
first sound holes positioned on a side surface of the housing;
a first sound conduit interconnecting the first sound holes and the speaker module;
a second sound hole positioned in a front surface of the housing;
a second sound conduit including a connection conduit disposed in a third direction perpendicular to the first direction with respect to the first sound conduit, the second sound conduit interconnecting the second sound hole and the receiver module; and
a connection portion interconnecting the first sound conduit and the connection conduit of the second sound conduit.

15. The electronic device of claim 14, wherein the connection portion is positioned closer to the speaker module than to the receiver module.

16. The electronic device of claim 14, wherein the connection portion is provided in the housing to extend in the third direction.

17. The electronic device of claim 14, wherein the connection conduit of the second sound conduit extends in the first direction.

18. The electronic device of claim 14, wherein the first sound conduit and the second sound conduit are provided in the housing.

19. The electronic device of claim 14, further comprising:
a display module comprising a display disposed to be directed to a front surface of the housing, wherein the second sound hole includes a hole formed in a slit shape between the display module and the housing.

20. The electronic device of claim 14, further comprising:
a display module comprising a display including a camera hole facing a lens of the camera module,
wherein the camera hole is positioned in an upper end center of the display module, and
centers of the first sound holes are aligned with the camera hole.

\* \* \* \* \*